United States Patent
Ishibashi et al.

(10) Patent No.: US 11,430,598 B2
(45) Date of Patent: Aug. 30, 2022

(54) POWER CONVERTER

(71) Applicant: Mitsubishi Electric Corporation, Chiyoda-ku (JP)

(72) Inventors: Takaharu Ishibashi, Chiyoda-ku (JP); Takushi Jimichi, Chiyoda-ku (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 332 days.

(21) Appl. No.: 16/638,334

(22) PCT Filed: Jul. 26, 2018

(86) PCT No.: PCT/JP2018/028059
§ 371 (c)(1),
(2) Date: Feb. 11, 2020

(87) PCT Pub. No.: WO2019/073658
PCT Pub. Date: Apr. 18, 2019

(65) Prior Publication Data
US 2020/0234869 A1    Jul. 23, 2020

(30) Foreign Application Priority Data
Oct. 12, 2017  (JP) .............................. JP2017-198357

(51) Int. Cl.
*H01F 27/24*    (2006.01)
*H01F 27/28*    (2006.01)
(Continued)

(52) U.S. Cl.
CPC ............. *H01F 27/24* (2013.01); *H01F 27/28* (2013.01); *H01F 30/10* (2013.01);
(Continued)

(58) Field of Classification Search
CPC .......... H01F 27/24; H01F 27/28; H01F 30/10; H02M 1/0077; H02M 1/0083; H02M 3/24;
(Continued)

(56) References Cited

U.S. PATENT DOCUMENTS 4,488,136 A     12/1984  Hansen et al.
2006/0131960 A1  6/2006  Aritsuka
(Continued)

FOREIGN PATENT DOCUMENTS

EP    1 770 849 A2    4/2007
EP    3 109 992 A1   12/2016
(Continued)

OTHER PUBLICATIONS

European Search Report dated Nov. 6, 2020 in European Application No. 18866096.3.
(Continued)

*Primary Examiner* — Adolf D Berhane
(74) *Attorney, Agent, or Firm* — Xsensus LLP

(57) ABSTRACT

A power converter performs DC power conversion between a pair of first DC terminals and a pair of second DC terminals. DC nodes of n DC/AC converters are connected in parallel or in series between the first DC terminals. A multiple transformer has n primary windings and n secondary windings. An AC node of each DC/AC converter is connected to its corresponding primary winding. An AC node of each AC/DC converter is connected to its corresponding secondary winding. DC nodes of n AC/DC converters are connected in series or in parallel between the second DC terminals. The multiple transformer is configured such that a magnetic path is shared among the n primary windings and a magnetic path is shared among the n secondary windings.

15 Claims, 16 Drawing Sheets

(51) Int. Cl.
  *H01F 30/10* (2006.01)
  *H02M 3/28* (2006.01)
  *H02M 1/00* (2006.01)
  *H02M 3/24* (2006.01)
(52) U.S. Cl.
  CPC ....... *H02M 1/0077* (2021.05); *H02M 1/0083* (2021.05); *H02M 3/24* (2013.01); *H02M 3/28* (2013.01); *H02M 1/0064* (2021.05); *H02M 1/0074* (2021.05); *H02M 3/285* (2013.01)
(58) Field of Classification Search
  CPC .... H02M 3/28; H02M 1/0074; H02M 1/0064; H02M 3/285
  See application file for complete search history.

(56) References Cited

U.S. PATENT DOCUMENTS

| | | |
|---|---|---|
| 2010/0102916 A1 | 4/2010 | Kiuchi et al. |
| 2011/0205007 A1 | 8/2011 | Kiuchi et al. |
| 2013/0083575 A1 | 4/2013 | Kippley et al. |
| 2016/0020016 A1 | 1/2016 | Ouyang et al. |
| 2019/0229625 A1* | 7/2019 | Jimichi .................. H02M 1/32 |
| 2019/0238050 A1* | 8/2019 | Jimichi ............. H02M 3/33507 |

FOREIGN PATENT DOCUMENTS

| | | |
|---|---|---|
| JP | 58-4912 A | 1/1983 |
| JP | 7-335456 A | 12/1995 |
| JP | 2000-50642 A | 2/2000 |
| JP | 2014-158350 A | 8/2014 |
| JP | 2015-6066 A | 1/2015 |
| JP | 2016-510948 A | 4/2016 |
| JP | 2017-11964 A | 1/2017 |
| JP | 2017-77114 A | 4/2017 |
| WO | WO 2005/078889 A1 | 8/2005 |
| WO | WO 2008/084757 A1 | 7/2008 |
| WO | WO 2010/073337 A1 | 7/2010 |

OTHER PUBLICATIONS

International Search Report dated Sep. 4, 2018 in PCT/JP2018/028059 filed Jul. 26, 2018, 2 pages.
Notice of Reasons for Refusal dated Dec. 14, 2018 in Japanese Patent Application No. 2018-563180 (with unedited computer generated English translation), 8 pages.
Office Action dated Apr. 7, 2022 in counterpart European Application No. 18866096.3.

* cited by examiner

POWER CONVERTER

TECHNICAL FIELD

The present invention relates to power converters that perform direct-current power conversion (DC/DC conversion), and more particularly, to an insulation-type power converter that performs DC/DC conversion through a transformer.

BACKGROUND ART

Japanese Patent Laying-Open No. 2017-11964 (PTL 1) describes a compact configuration suitable for a wind turbine generation system as an example power converter that performs DC/DC conversion in which an input and an output are insulated from each other through a transformer.

In the power converter of PTL 1, a multiple winding transformer including a secondary winding divided into several portions is connected for each of the outputs of DC/AC transformers connected in parallel on the output side of the wind turbine generation system, and the outputs of AC/DC transformers, each arranged for a corresponding one of the divided portions of the secondary winding of the multiple winding transformer, are connected to each other in series, thereby achieving a configuration suitable for the wind turbine generation system.

CITATION LIST

Patent Literature

PTL 1: Japanese Patent Laying-Open No. 2017-11964

SUMMARY OF INVENTION

Technical Problem

According to PTL 1, a required step-up ratio can be obtained easily by connecting the outputs of the AC/DC converters, each connected to a corresponding one of the secondary windings of the multiple winding transformer, in series in place of increasing the turn ratios of the transformers. In particular, PTL 1 describes that increasing the number of secondary windings arranged in the multiple winding transformer can reduce the number of unit modules arranged in parallel, that is, the number of DC/AC transformers connected in parallel on the primary side (wind turbine generation facility side).

High-voltage, high-capacity DC/DC conversion use, however, needs the parallel arrangement of a high number of DC/AC transformers on the primary side of the transformer in order to obtain current capacity. Thus, application of the configuration of PTL 1 to high-capacity use results in the arrangement of a high number of multiple transformers which intend to have a relatively larger size. This may make it difficult for the power converter to have a smaller size.

The present invention has been made to solve the above problem, and therefore has an object to provide a power converter that performs DC/DC conversion through a transformer with a configuration suitable for miniaturization in high-voltage and/or high-capacity use.

Solution to Problem

According to one aspect of the present invention, a power converter performs DC voltage conversion between a pair of first DC terminals and a pair of second DC terminals. The power converter includes a plurality of DC/AC converters, a plurality of AC/DC converters, and a multiple transformer connected between the DC/AC converters and the AC/DC converters. Each DC/AC converter performs DC/AC power conversion between DC nodes and an AC node. Each AC/DC converter performs AC/DC power conversion between an AC node and DC nodes. DC nodes of the plurality of DC/AC converters each having the DC nodes are connected in parallel or in series between the first DC terminals. The AC/DC converters are connected in parallel or in series between the second DC terminals. The multiple transformer includes a plurality of primary windings, a plurality of secondary windings, and a core portion around which the primary windings and the secondary windings are wound. Each of the primary windings is connected to a corresponding one of the DC nodes of the DC/AC converters. Each of the secondary windings is connected to a corresponding one of the AC nodes of the AC/DC converters. The core portion is configured such that a magnetic path is shared among the primary windings and a magnetic path is shared among the secondary windings.

Advantageous Effects of Invention

According to the present invention, a configuration suitable for high voltage and/or high current can be obtained through series or parallel connection of the DC/AC converters between the first DC terminals and series or parallel connection of the AC/DC converters between the second DC terminals. Also, the power converter can be miniaturized with the use of the multiple transformer in which a magnetic path is shared among as many primary windings as DC/AC converters and a magnetic path is shared among as many secondary windings as AC/DC converters.

DESCRIPTION OF EMBODIMENTS

Figure 1:
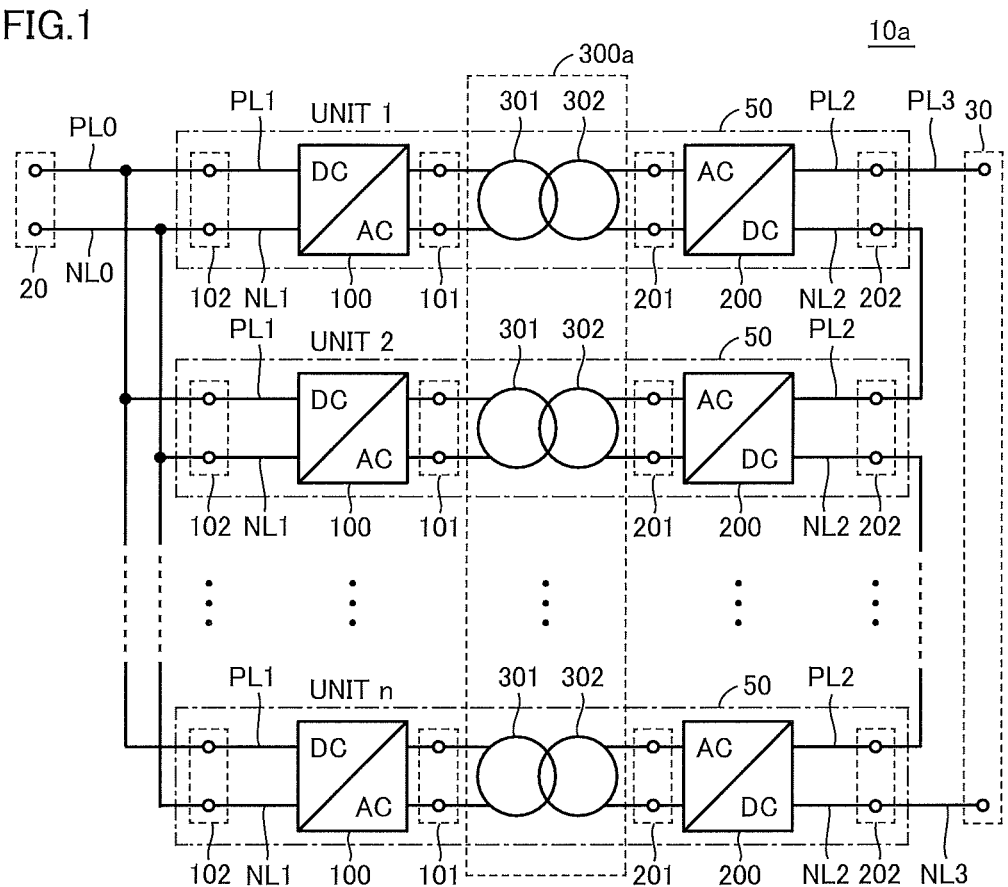
FIG. 1 is a circuit diagram showing an example configuration of a power converter according to Embodiment 1.

Embodiments of the present invention will now be described in detail with reference to the drawings, in which the same or corresponding portions are denoted by the same reference characters and description thereof will not be repeated.

Embodiment 1

FIG. 1 is a circuit diagram showing an example configuration of a power converter $10a$ according to Embodiment 1.

Referring to FIG. 1, power converter $10a$ includes a pair of first DC terminals 20, which are connected with a positive power supply line PL0 and a negative power supply line NL0, a pair of second DC terminals 30, which are connected with a positive power supply line PL3 and a negative power supply line NL3, n (n is a natural number where n≥2) DC/DC conversion units 50, and a multiple transformer $300a$. Power converter $10a$ performs power conversion (DC/DC conversion) for DC power conversion between first DC terminals 20 and second DC terminals 30.

Each DC/DC conversion unit 50 has DC terminals 102 and DC terminals 202. n DC terminals 102 corresponding one-to-one to n DC/DC conversion units 50 are connected between DC terminals 20 through positive power supply line PL0 and negative power supply line NL0.

In contrast, n DC terminals 202 corresponding one-to-one to n DC/DC conversion units 50 are connected in series between positive power supply line PL3 and negative power supply line NL3. That is to say, n DC terminals 202 are connected in series between DC terminals 30.

The configuration of each DC/DC conversion unit 50 will now be described. DC/DC conversion unit 50 includes a DC/AC converter 100, AC terminals 101 and 201, and an AC/DC converter 200, in addition to DC terminals 102 and 202. AC terminals 101 are connected with one primary winding 301 of multiple transformer $300a$. AC terminals 201 are connected with one secondary winding 302 of multiple transformer $300a$.

Figure 2:
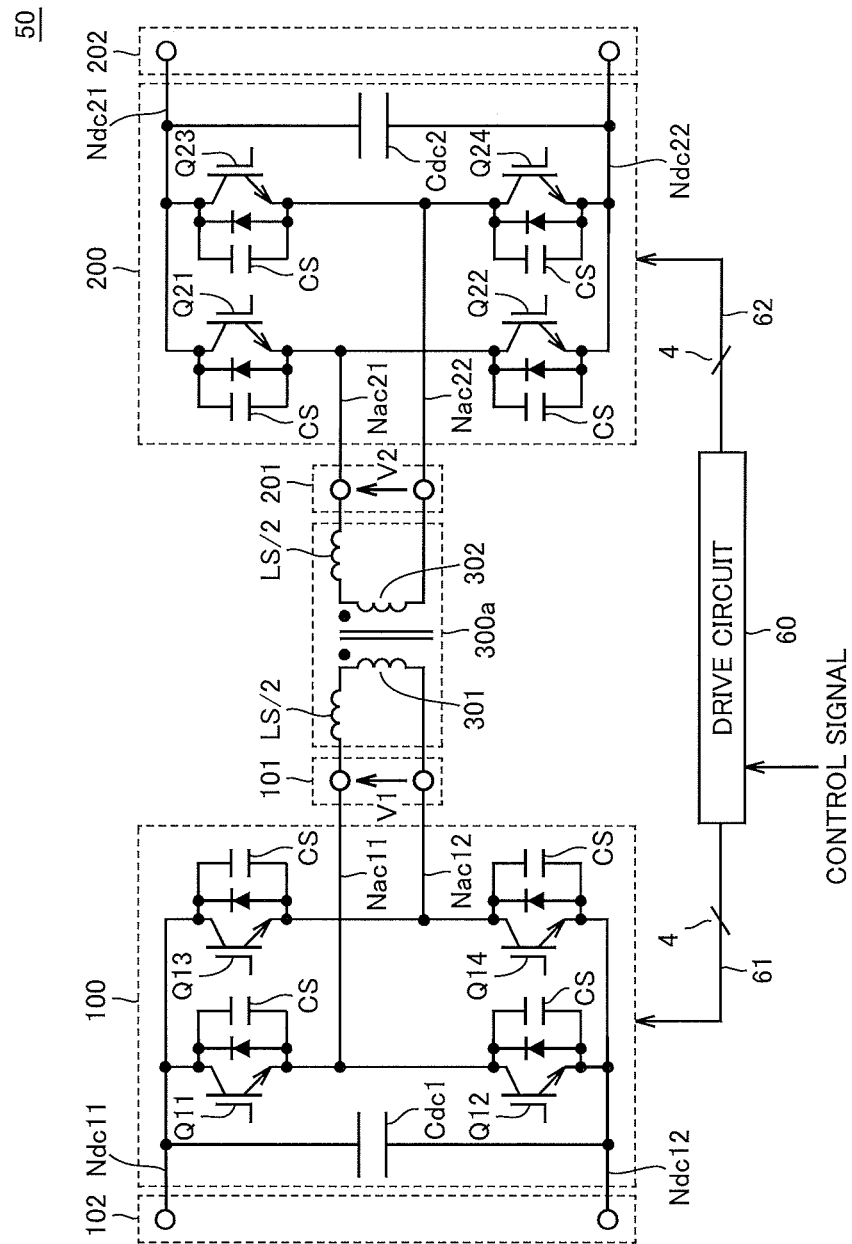
FIG. 2 is a circuit diagram showing an example configuration of a DC/DC conversion unit shown in FIG. 1.

FIG. 2 is a circuit diagram showing an example configuration of DC/DC conversion unit 50 shown in FIG. 1.

Referring to FIG. 2, DC/DC conversion unit 50 has DC/AC converter 100 connected between DC terminals 102 and AC terminals 101, and AC/DC converter 200 connected between AC terminals 201 and DC terminals 202.

DC/AC converter 100 has a DC capacitor Cdc1 and semiconductor switching elements Q11 to Q14. DC capacitor Cdc1 is connected between DC nodes Ndc11 and Ndc12 and is connected in parallel with DC terminals 102. Semiconductor switching elements Q11 and Q12 are connected in series between DC nodes Ndc11 and Ndc12 through an AC node Nac11. Similarly, semiconductor switching elements Q13 and Q14 are connected in series between DC nodes Ndc11 and Ndc12 through an AC node Nac12.

Similarly, AC/DC converter 200 has a DC capacitor Cdc2 and semiconductor switching elements Q21 to Q24. DC capacitor Cdc2 is connected between DC nodes Ndc21 and Ndc22 and is connected in parallel with DC terminals 202. Semiconductor switching elements Q21 and Q22 are connected in series between DC nodes Ndc21 and Ndc22 through an AC node Nac21. Similarly, semiconductor switching elements Q22 and Q24 are connected in series between DC nodes Ndc21 and Ndc22 through an AC node Nac22.

In DC/AC converter 100, thus, a full-bridge circuit is composed of two switching legs with semiconductor switching elements Q11 and Q13 on the positive side and semiconductor switching elements Q12 and Q14 on the negative side. Similarly, also in AC/DC converter 200, a full-bridge circuit is composed of two switching legs with semiconductor switching elements Q21 and Q23 on the positive side and semiconductor switching elements Q22 and Q24 on the negative side.

Semiconductor switching elements Q11 to Q14 and Q21 to Q24 may be, for example, any semiconductor switching element having a self-turn off function, for example, insulated gate bipolar transistors (IGBTs) to which diodes are connected in antiparallel. Each semiconductor switching elements Q11 to Q24 may be configured with a plurality of semiconductor elements connected in parallel, in accordance with current capacity for use.

A drive circuit 60 generates, in accordance with a control signal from a controller (not shown) that controls power converter $10a$, gate signals 61 for controlling ON and OFF of semiconductor switching elements Q11 to Q14 and gate signals 62 for controlling ON and OFF of semiconductor switching elements Q21 to Q24. The voltage across a control electrode (gate) of each semiconductor switching element is controlled in accordance with a corresponding one of gate signals 61 and 62, so that semiconductor switching elements Q11 to Q14 and Q21 to Q24 are switching-controlled. Drive circuit 60 can be formed of a known typical gate drive circuit.

Figure 3:
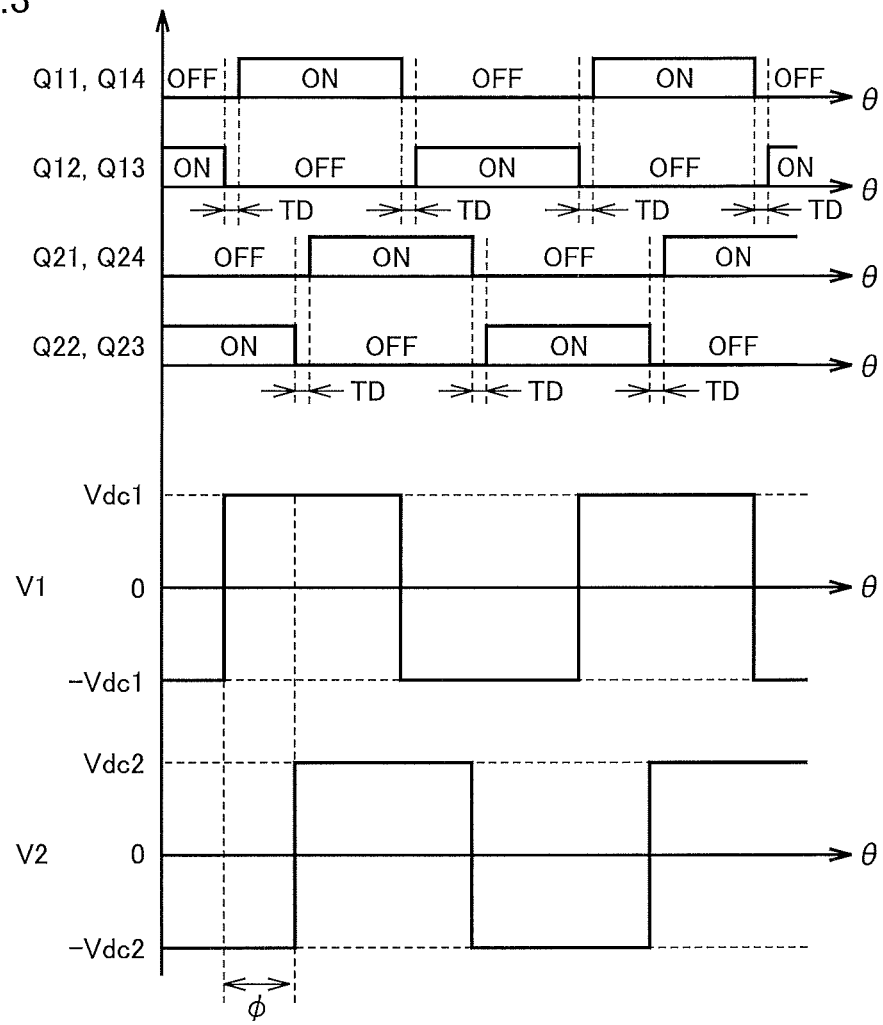
FIG. 3 shows example operation waveforms of the DC/DC conversion unit shown in FIG. 2.

FIG. 3 shows example operation waveforms of DC/DC conversion unit 50 shown in FIG. 2.

Referring to FIG. 3, at each leg of DC/AC converter 100, semiconductor switching elements Q11 and Q14 on the positive side are turned on and off in a complementary manner to semiconductor switching elements Q12 and Q13 on the negative side. A dead time TD for preventing a short-circuit between DC nodes Ndc11 and Ndc12 in the same leg is provided between an ON period of semiconductor switching elements Q11 and Q14 on the positive side and an ON period of semiconductor switching elements Q12 and Q13 on the negative side. As a result of switching control of semiconductor switching elements Q11 to Q14, DC/AC power conversion is performed between a DC voltage between DC nodes Ndc11 and Ndc12 and an AC voltage V1 between AC nodes Nac11 and Nac12, that is, between AC terminals 101.

Similarly, at each leg of AC/DC converter 200, semiconductor switching elements Q21 and Q24 on the positive side are turned on and off in a complementary manner to semiconductor switching elements Q22 and Q23 on the negative side. A dead time TD as described above is provided between an ON period of semiconductor switching elements Q21 and Q24 on the positive side and an ON period of semiconductor switching elements Q22 and Q23 on the negative side. As a result of switching control of semiconductor switching elements Q21 to Q24, AC/DC power conversion is performed between an AC voltage V2 between AC terminals 201, that is, between AC nodes Nac21 and Nac22 and a DC voltage between DC nodes Ndc21 and Ndc22.

Primary winding 301 and secondary winding 302 respectively connected to AC terminals 101 and 102 of the same DC/DC conversion unit 50 are wound around a core portion of multiple transformer 300a to be magnetically coupled to each other. Consequently, a voltage ratio between an amplitude (Vdc1) of AC voltage V1 between AC terminals 101 and an amplitude (Vdc2) of AC voltage V2 between AC terminals 201 has a value corresponding to the turn ratio between primary winding 301 and secondary winding 302.

In DC/DC conversion unit 50, a phase difference $\varphi$ between AC voltage V1 output from DC/AC converter 100 and AC voltage V2 output from AC/DC converter 200 can be controlled to control transmission power. Phase difference $\varphi$ can be controlled by a control signal input to drive circuit 60. Specifically, drive circuit 60 generates, in accordance with the control signal with phase difference $\varphi$ set for control of transmission power, gate signals 61 and 62 for the semiconductor switching elements so as to adjust the turn-on timing of the semiconductor switching elements on the positive side (i.e., the turn-on timing between Q11, Q14 and Q21, Q24) and the turn-off timing of the semiconductor switching elements on the negative side (i.e., the turn-off timing between Q12, Q13 and Q22, Q23) between DC/AC converter 100 and AC/DC converter 200.

Setting the switching frequency of each of semiconductor switching elements Q11 to Q14 and Q21 to Q24 of smaller size to a higher frequency (e.g., not less than 61 Hz which is higher than the frequency of a commercial AC power supply) may lead to an increase in the loss of multiple transformer 300a. In such a case, however, using an amorphous material as an iron core material can restrain an increase in the loss caused by a higher frequency.

Parallel connection of a snubber capacitor CS with each of semiconductor switching elements Q11 to Q14 and Q21 to Q24 allows the voltage waveform of each semiconductor switching element to have a sinusoidal-wave shape with the use of the resonance phenomenon due to the actions of snubber capacitors CS and inductances LS of AC nodes Nac11 to Nac22. Consequently, soft switching is enabled owing to the application of zero-voltage switching in ON and OFF of each of semiconductor switching elements Q11 to Q14 and Q21 to Q24. Since the application of soft switching can reduce switching loss and electromagnetic noise, increasing the operating frequency can lead to a smaller size of multiple transformer 300a, which will be described below. Inductances LS can be leakage inductances of primary winding 301 and secondary winding 302.

DC capacitors Cdc1 and Cdc2 can be, for example, electrolytic capacitors or film capacitors. Although a high-frequency current flows through DC capacitors Cdc1 and Cdc2, the degradation due to the high-frequency current can be restrained in the use of film capacitors, thus leading to a longer life.

The configurations of DC/AC converter 100 and AC/DC converter 200 which are shown in FIG. 2 are merely examples, and any circuit configuration is applicable as long as DC/AC conversion and AC/DC conversion can be performed as described above by ON and OFF of the semiconductor switching elements. Providing a similar configuration to each of a plurality of (n) DC/DC conversion units 50 can simplify tests and improve manufacturability.

Referring to FIG. 1 again, n DC/AC converters 100 and n AC/DC converters 200 are arranged corresponding to n DC/DC conversion units 50 in the whole power converter 10a. Multiple transformer 300a has n primary windings 301 and n secondary windings 302.

In the example configuration of FIG. 1, n DC/DC conversion units 50 are connected in parallel on the DC terminal 20 side and are connected in series on the DC terminal 30 side, as described above. Parallel connection of DC/DC conversion units 50 can deal with high current. In contrast, series connection of DC/DC conversion units 50 can deal with high voltage. In the example configuration of FIG. 1, thus, power converter 10a is suitable for high-voltage, high-current use in which the DC voltage between DC terminals 20 is boosted and output to between DC terminals 30.

In the example configuration of FIG. 1, n DC/AC converters 100 can be connected in series on the DC terminal 20 side, whereas n AC/DC converters 200 can be connected in parallel on the DC terminal 30 side. In another configuration, n DC/AC converters 100 and n AC/DC converters 200 can be connected in series on both the DC terminal 20 side and the DC terminal 30 side, or n DC/AC converters 100 and n AC/DC converters 200 can be connected in parallel on both the DC terminal 20 side and the DC terminal 30 side.

Figure 4:
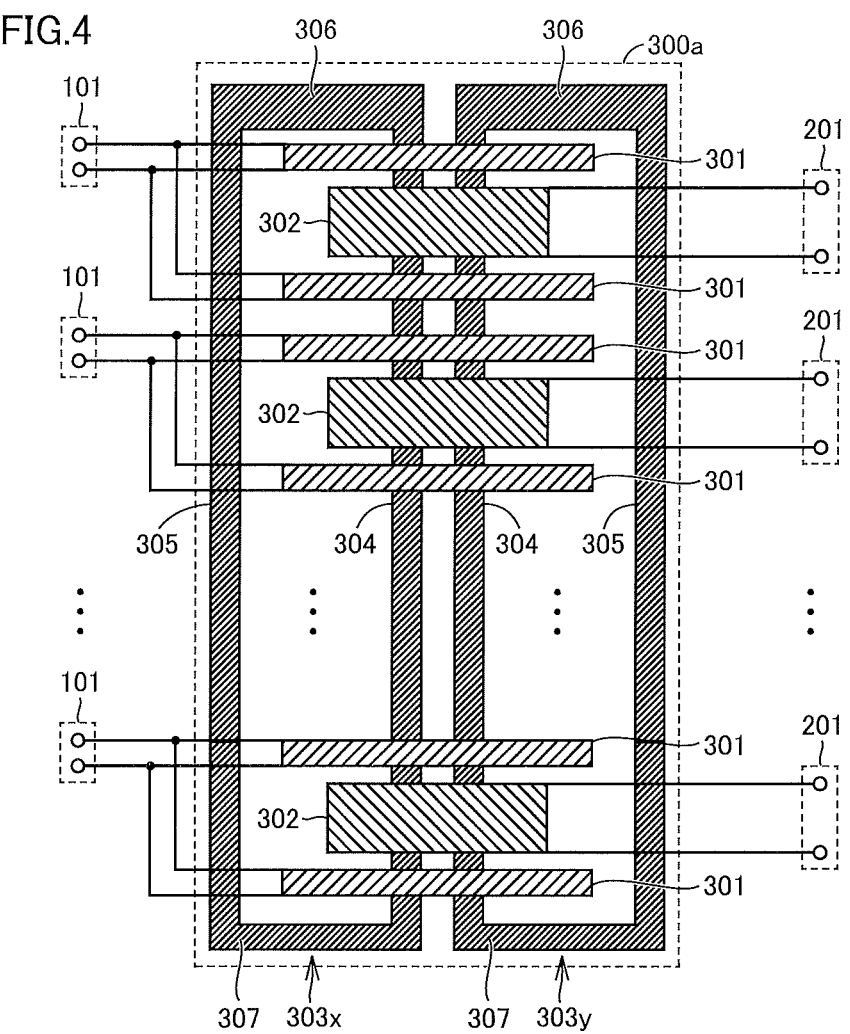
FIG. 4 is a conceptual diagram illustrating an example configuration of a multiple transformer in Embodiment 1 which is shown in FIG. 1.

FIG. 4 shows an example configuration of multiple transformer 300a in Embodiment 1.

Referring to FIG. 4, multiple transformer 300a has two annular rectangular iron cores 303x and 303y constituting the "core portion". Each of annular rectangular iron cores 303x and 303y can be formed of a plurality of ribbon-shaped magnetic materials stacked in the vertical direction in the sheet of paper of FIG. 4. When annular rectangular iron cores 303x and 303y are collectively referred to, they are merely referred to as an annular rectangular iron core 303 as well.

Annular rectangular iron core 303 has iron core legs 304 and 305 extending in the up-down direction in the sheet of paper and yokes 306 and 307 connecting the ends of iron core legs 304 and 305 to each other. Primary windings 301 and secondary windings 302 of multiple transformer 300a are wound around one of two iron core legs of annular rectangular iron core 303x and its adjacent one of two iron core legs of annular rectangular iron core 303y. Hereinafter, one of iron core legs of each of annular rectangular iron cores 303x and 303y, around which primary windings 301 and secondary windings 302 are wound, will be denoted by a reference 304, and the other iron core leg around which no windings are wound will be denoted by a reference 305.

In primary windings 301 and n secondary windings 302 are wound around common annular rectangular iron cores 303x and 303y. It is thus understood that a magnetic path is shared among n primary windings 301 and a magnetic path is shared among n secondary windings 302.

In each DC/DC conversion unit 50 (FIG. 2), primary winding 301 is connected with AC terminals 101, and secondary winding 302 is connected with AC terminals 201. Primary winding 301 and secondary winding 302 are magnetically coupled to each other by annular rectangular iron cores 303x and 303y. One primary winding 301 and one secondary winding 302 connected with the same DC/DC conversion unit 50 are wound around annular rectangular iron cores 303x and 303y so as to be closer to each other than to primary winding 301 and secondary winding 302 connected with any other DC/DC conversion unit 50.

Each of between primary winding 301 and annular rectangular iron core 303, between secondary winding 302 and annular rectangular iron core 303, and between primary winding 301 and secondary winding 302, an insulating distance corresponding to a potential difference therebetween is maintained. It is known that a required insulating distance increases non-linearly, not proportionally, to an increase in potential difference.

As shown in FIG. 1, on the secondary side on which DC/DC conversion units 50 are connected in series, a potential applied to secondary winding 302 through AC terminals 201 also increases due to a higher voltage generated between DC terminals 30. This increases the insulating distance required between secondary winding 302 and annular rectangular iron core 303, which may increase the size of multiple transformer 300a due to increased dimensions (in particular, the dimension in the up-down direction in the sheet of paper of FIG. 4) of annular rectangular iron core 303.

In the example configuration of FIG. 4, thus, primary winding 301 is divided into a plurality of portions and arranged in the winding configuration corresponding to each DC/DC conversion unit 50. Each winding after division is connected in parallel with AC terminals 101. Further, secondary winding 302 is arranged to be sandwiched between primary windings 301 after division.

Consequently, at each end of annular rectangular iron core 303, secondary winding 302 is arranged while sandwiching primary winding 301 between a corresponding one of yokes 306 and 307 and secondary winding 302. When secondary winding 302 has high voltage, an insulating distance D1, which is necessary between secondary winding 302 and the iron core (ground potential), is much greater than an insulating distance D2, which is necessary between secondary winding 302 and primary winding 301, and an insulating distance D3, which is necessary between primary winding 301 and the iron core, namely, ground potential, (D1>>D2, D3 and D1>(D2+D3)). Thus, the arrangement as shown in FIG. 4 can reduce the dimension of annular rectangular iron core 303 (iron core legs 304 and 305) in the up-down direction in the sheet of paper. Although primary windings 301 after division are adjacent to each other between different DC/DC conversion units 50 in the example configuration of FIG. 4, primary windings 301 have the same potential. Consequently, the division of primary winding 301 can avoid a significant increase in the dimensions of annular rectangular iron core 303 for leaving an insulating distance.

Primary winding 301 is divided and arranged to sandwich secondary winding 302 in the example configuration of FIG. 1 because, of primary winding 301 and secondary winding 302, secondary winding 302 has a relatively high potential with respect to the iron core (ground potential). In the case where primary winding 301 has a potential higher than that of secondary winding 302 in power converter 10a, accordingly, secondary winding 302 may be divided and arranged to sandwich primary winding 301, as opposed to the example of FIG. 4.

Figure 5:
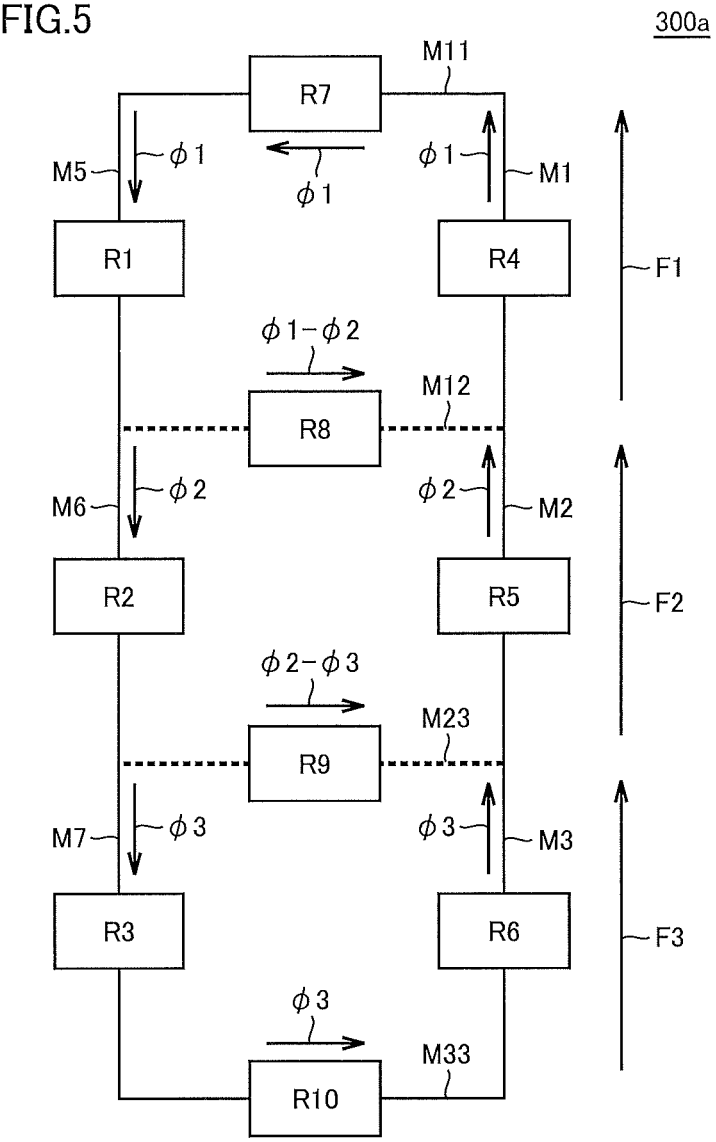
FIG. 5 is a conceptual diagram illustrating an example magnetic circuit model of the multiple transformer in Embodiment 1.

FIG. 5 is a conceptual diagram illustrating an example magnetic circuit model of multiple transformer 300a in Embodiment 1. For simplification of description, FIG. 5 does not reflect leakage flux and shows only a magnetic circuit formed in annular rectangular iron core 303 on one side when primary winding 301 is excited.

FIG. 5 also shows the magnetic circuit model when three (n=3) primary windings 301 are provided, and magnetic resistances R1 to R10 are generated in annular rectangular iron core 303 of multiple transformer 300a.

Referring to FIG. 5, as current flows through three primary windings 301, magnetomotive forces F1, F2, and F3, which respectively produce magnetic fluxes φ1, φ2, and φ3, are generated. Magnetomotive force F1 produces magnetic flux φ1 through a magnetic path M11. Magnetic paths M5, M12, and M1 serve as a path of magnetic flux φ1. Similarly, magnetomotive force F2 produces magnetic flux φ2 through magnetic path M12. Magnetic paths M6, M23, and M2 serve as a path of magnetic flux φ2. Also, magnetomotive force F3 produces magnetic flux φ3 through magnetic path M23. Magnetic paths M7, M33, and M3 serve as a path of magnetic flux φ3.

Herein, magnetic flux φ in the iron core can be calculated by Equation (1) below:

$$\varphi(\theta) = [1/(N \times f)] \times \int V(\theta) d\theta \quad (1)$$

where $V(\theta)$ represents an AC voltage applied to primary winding 301, $\theta$ and f respectively represent the phase and frequency of the AC voltage, and N represents the number of turns of primary winding 301.

Based on Equation (1), a maximum value φmax of magnetic flux φ can be determined according to Equation (2) below:

$$\varphi max = K \times Vrms \times [1/(N \times f)] \quad (2)$$

where Vrms represents an effective value of an AC voltage applied to primary winding 301, and K represents a constant of proportionality. K=1/4.44 when AC voltage $V(\theta)$ has a sine wave, and K=¼ when AC voltage $V(\theta)$ has a rectangular wave.

When AC voltages applied to primary windings 301 have an equal maximum value, an equal frequency, and an equal phase, magnetic flux φ12 of magnetic path M12=φ1−φ2=0, and magnetic flux φ23 of magnetic path M23=φ2−φ3=0. Thus, the magnetic flux passes through other than magnetic path M12 and magnetic path M23, eliminating the need for iron cores for forming magnetic path M12 and magnetic path M23. This eliminates the need for the arrangement of iron cores (hereinafter also referred to as bypass iron cores) for forming magnetic paths corresponding to magnetic paths M12 and M23 indicated by the dotted lines in FIG. 5 between the portions, around which primary winding 301 (and secondary winding 302) are wound, corresponding to different DC/DC conversion units 50.

Such elimination of the need for arranging the bypass iron cores can miniaturize a multiple transformer owing to miniaturization of annular rectangular iron core 303. The iron core portion (the portion corresponding to magnetic paths M1 to M3, M11, M5 to M7, and M33 in FIG. 5) through which magnetic fluxes φ1 to φ3 pass in annular rectangular iron core 303 is also referred to as a "main iron core".

Contrastingly, when the applied AC voltages do not have an equal maximum value, an equal frequency, and an equal phase among primary windings 301, magnetic fluxes φ12 and φ23 are not equal to zero, so magnetic fluxes φ1 to φ3 interfere with each other. The occurrence of such a phenomenon causes the interference of transmission power P of one DC/DC conversion units 50 and transmission power P of another DC/DC conversion unit 50, which would be originally controlled individually. For example, a "cross-current" is generated, in which the power of any DC/DC conversion unit 50 flows into another DC/DC conversion unit 50. Upon generation of a cross-current, DC/DC conversion unit 50 into which power has flowed from the other DC/DC conversion unit 50 transmits power higher than the original power to be transmitted, and accordingly has an increased power loss.

In other words, when the AC voltage applied to primary windings 301 can have an maximum value, an equal frequency, and an equal phase, multiple transformer 300a can be achieved with a simple configuration including a main iron core and windings (primary winding 301 and secondary winding 302). As a result, multiple transformer 300a can be miniaturized, and a power loss in power conversion in each DC/DC conversion unit 50 can be restrained.

Herein, DC/DC conversion units 50 are configured equally and are usually used at the same frequency. Also, in order to operate DC/DC conversion units 50 equally, the maximum value of the AC voltage applied to primary winding 301 is made equal among DC/DC conversion units 50. Similarly, the maximum value of the AC voltage applied to secondary winding 302 is made equal among DC/DC conversion units 50.

Meanwhile, as shown in FIG. 2, each DC/DC conversion unit 50 operates as drive circuit 60 generates gate signals 61 and 62 in response to control signals from the control circuit (not shown) of power converter 10a. Thus, as gate signals 61 of DC/AC converter 100 are shared and gate signals 62 of AC/DC converter 200 are shared among DC/DC conversion units 50, DC/DC conversion units 50 can operate in the same phase. Specifically, semiconductor switching elements Q11 to Q14 can be turned on and off in the same phase such that the maximum value, frequency, and phase of AC voltage V1 between AC nodes Nac11 and Nac12 are made equal among n DC/AC converters 100. Similarly, semiconductor switching elements Q21 to Q24 can be turned on and off in the same phase such that the maximum value, frequency, and phase of AC voltage V2 between AC nodes Nac21 and Nac22 are made equal among n AC/DC converters 200.

FIG. 2 illustrates control in which gate signals 61 and 62 are shared. Alternatively, as semiconductor switching elements Q11 to Q14 are turned on and off in the same phase, different gate signals 61 can be used among DC/AC converters 100 as long as the maximum value, frequency, and phase of AC voltage V1 are equal among DC/AC converters 100. For example, a delay time in a transmission path of gate signal 61 can be adjusted finely among DC/AC converters 100 to increase the degree of equality of AC voltage V1. Similarly, as semiconductor switching elements Q21 to Q24 are turned on and off in the same phase, different gate signals 62 can be used among AC/DC converters 200 as long as the maximum value, frequency, and phase of AC voltage V2 are equal among AC/DC converters 200.

As described above, according to the power converter according to Embodiment 1, the power converter can be miniaturized by using multiple transformer 300a, in which a magnetic path is shared among as many primary windings as DC/AC converters and a magnetic path is shared among as many secondary windings as AC/DC converters, in the configuration in which a plurality of DC/AC converters and a plurality of AC/DC converters are connected in series or in parallel on the primary side and the secondary side of the transformer, respectively, for high-voltage and/or high-current use.

As shown in FIG. 4, further, the multiple transformer can be miniaturized further owing to miniaturization of iron cores by dividing one winding having a relatively lower voltage of the primary winding and the secondary winding and arranging the divided winding to sandwich the other winding having a higher voltage.

As the semiconductor switching elements of a plurality of DC/AC converters are controlled to be turned on and off in the same phase and the semiconductor switching elements of a plurality of AC/DC converters are controlled to be turned on and off in the same phase, an increase in power loss can be restrained in the configuration including a miniaturized multiple transformer and including no bypass iron cores.

Although semiconductor switching elements Q11 to Q14 and Q21 to Q24 used in Embodiment 1 are usually made of silicon (Si), semiconductor switching elements made of silicon carbide (SiC) or gallium nitride (GaN), which are wide bandgap semiconductors having a bandgap larger than that of silicon (Si), diamond, or the like can also be used. Consequently, higher voltages can be input to and output from each DC/AC converter 100 and each AC/DC converter 200, leading to a configuration more suitable for high-voltage use. Also, the switching frequency of a semiconductor switching element can be made higher, further miniaturizing multiple transformer 300a.

Embodiment 2

Embodiment 1 has described the configuration and control in which DC/DC conversion units 50 operate equally to restrain an increase in power loss due to the generation of a cross-current. In the presence of individual differences among components of DC/DC conversion units 50, however, the phase and the maximum value of the AC voltage are not necessarily equal among DC/DC conversion units 50. For components to be shared among DC/DC conversion units 50, the maximum value of voltage needs to be equal among DC/DC conversion units 50. Embodiment 2 will thus describe the configuration and control for accommodating individual differences among components.

Figure 6:
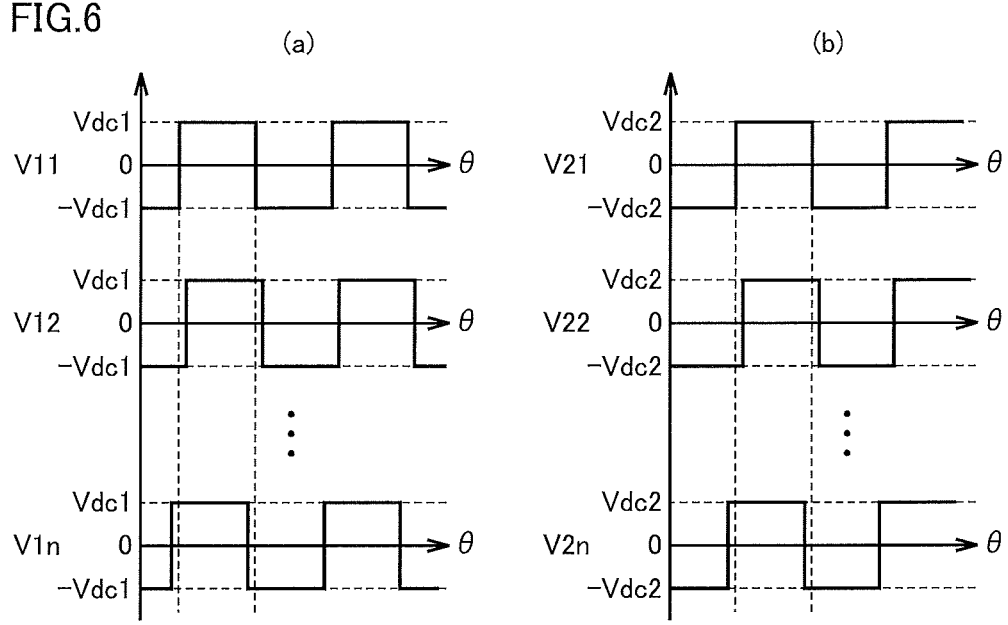
FIG. 6 is a voltage control waveform chart in a DC/DC conversion unit in a power converter according to Embodiment 2.

FIG. 6 is a voltage control waveform chart in a power converter according to Embodiment 2.

FIG. 6(a) shows AC voltages V11, V12 . . . V1n between AC terminals 101 of n DC/AC converters 100. FIG. 6(b) shows AC voltage V21, V22 . . . V2n between AC terminals 201 of n AC/DC converters 200.

In Embodiment 1, DC/AC converters 100 operate in common in accordance with a common gate signals 61, and accordingly, AC voltage V1 has the same phase among n DC/AC converters 100. Also, AC/DC converters 200 operate in common in accordance with a common gate signals 62, and accordingly, AC voltage V2 has the same phase among n AC/DC converters 200.

Contrastingly, in Embodiment 2, the power transmission by each of n DC/DC conversion units 50 is adjusted individually such that AC voltages V11 to V1n have the same amplitude (maximum voltage Vdc1) and AC voltages V21 to V2n have the same amplitude (maximum voltage Vdc2). Phase difference φ described with reference to FIG. 3 is thus set individually for each DC/DC conversion unit 50.

As a result, drive circuit 60 individually generates gate signals 61 and 62 for each DC/DC conversion unit 50 in accordance with phase difference φ set for each DC/DC conversion unit 50. Consequently, AC voltages V11 to V1n do not have an equal phase as shown in FIG. 6(a), and AC voltages V21 to V2n do not have an equal phase as shown in FIG. 6(b).

Inn DC/AC converters 100, semiconductor switching elements Q11 to Q14 are individually controlled to be turned on and off by individual gate signals 61 such that AC voltages V11 to V1n between AC nodes Nac11 and Nac12 have an equal maximum value and an equal frequency. Similarly, semiconductor switching elements Q21 to Q24 are individually controlled to be turned on and off such that AC voltage V2 between AC nodes Nac21 and Nac22 has an equal maximum value and an equal frequency also in n AC/DC converters 200.

As a result, the phase of the AC voltage is not equal among primary windings 301 and among secondary windings 302, and accordingly, in the magnetic circuit model shown in FIG. 5, a magnetic flux $\varphi 12$ ($\varphi 1-\varphi 2$) of magnetic path M12 and a magnetic flux $\varphi 23$ ($\varphi 2-\varphi 3$) of magnetic path M23 are not zero, and magnetic flux $\varphi 1$ due to magnetomotive force F1 thus interferes with magnetic fluxes $\varphi 2$ and $\varphi 3$. Similarly, magnetic flux $\varphi 2$ due to magnetomotive force F2 interferes with magnetic fluxes $\varphi 1$ and $\varphi 3$, and magnetic flux $\varphi 3$ due to magnetomotive force F3 interferes with magnetic fluxes $\varphi 1$ and $\varphi 2$. Consequently, the transmission power in one DC/DC conversion unit 50 interferes with the transmission power of another DC/DC conversion unit 50, which would be originally controlled individually, leading to the generation of a cross-current described above. The generation of a cross-current may result in an increase in power loss, a decrease in controllability, and a decrease in operation reliability of DC/DC conversion unit 50.

Figure 7:
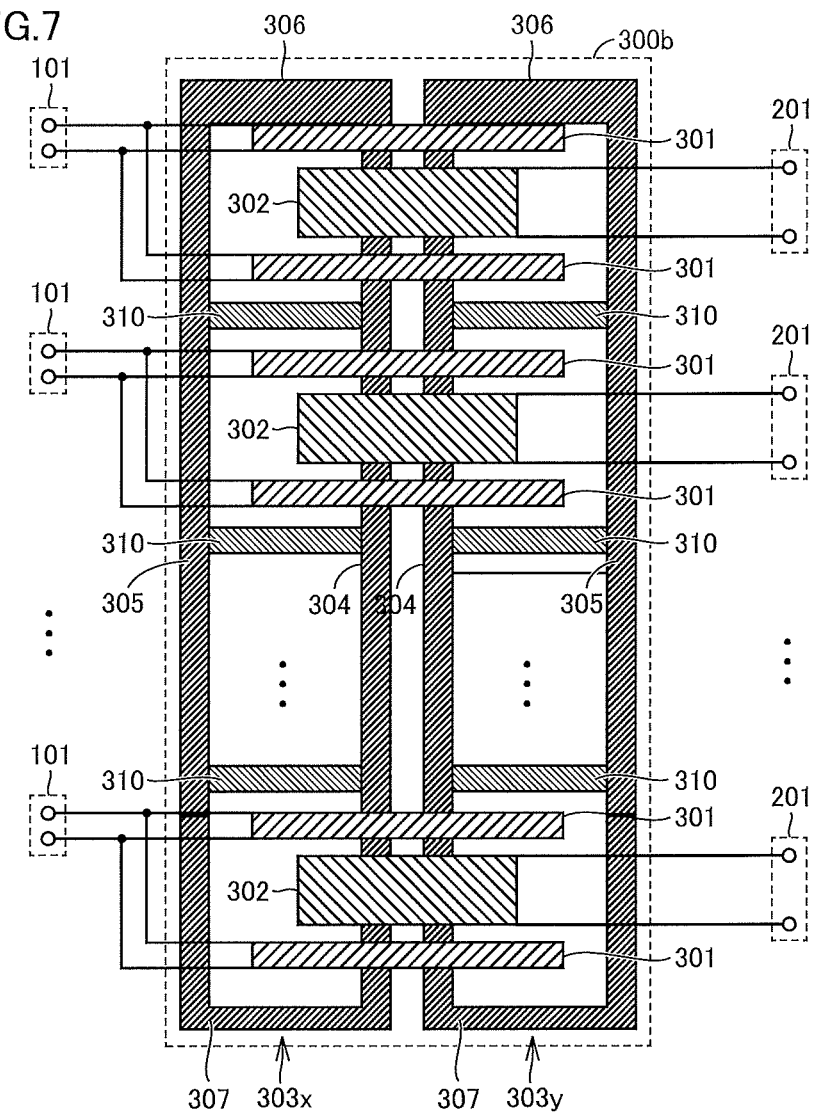
FIG. 7 is a conceptual diagram illustrating an example configuration of a multiple transformer used in the power converter according to Embodiment 2.

Thus, a multiple transformer 300b shown in FIG. 7 is used in the power converter according to Embodiment 2, in place of multiple transformer 300a shown in FIG. 4. In other words, the power converter according to Embodiment 2 can be configured by replacing multiple transformer 300a with multiple transformer 300b shown in FIG. 7, connecting each AC terminal 101 to its corresponding primary winding 301 of multiple transformer 300b, and connecting each AC terminal 201 to its corresponding secondary winding 302 of multiple transformer 300b in power converter 10a shown in FIG. 1.

Referring to FIG. 7, multiple transformer 300b according to Embodiment 2 differs from multiple transformer 300a (FIG. 4) according to Embodiment 1 in that the "core portion" further includes bypass iron cores 310 arranged between iron core legs 304 and 305 in each of annular rectangular iron cores 303x and 303y. Since the other components of multiple transformer 300b are similar to those of multiple transformer 300a, detailed description thereof will not be repeated.

As shown in FIG. 7, primary winding 301 and secondary winding 302 corresponding to the same DC/DC conversion unit 50 are wound adjacent to each other. Bypass iron core 310 is arranged such that an area of iron core leg 304, around which primary winding 301 and secondary winding 302 are both not wound, is connected with iron core leg 305. This area is located between different DC/DC conversion units 50. For example, in the configuration in which n DC/DC conversion units 50 are arranged, (n−1) bypass iron cores 310 are arranged. In other words, primary winding 301 and secondary winding 302 connected to each DC/DC conversion unit 50 are wound for each area magnetically separated by bypass iron core 310 in iron core legs 304 and 305.

Figure 8:
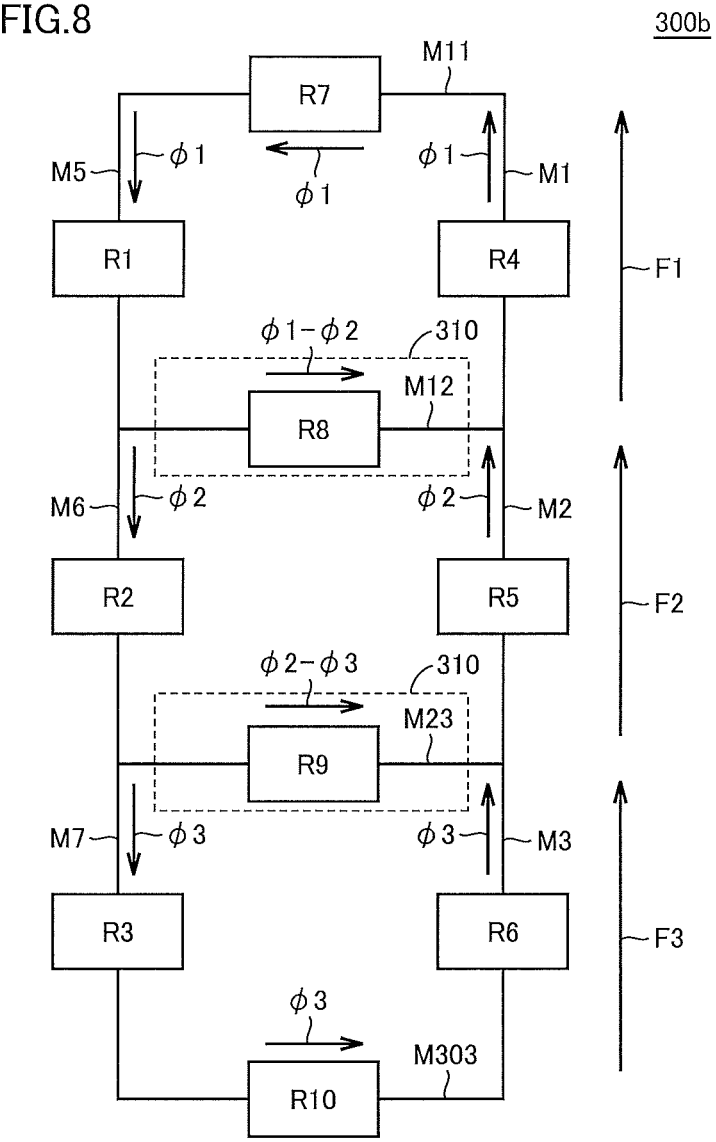
FIG. 8 is a conceptual diagram illustrating an example magnetic circuit model of the multiple transformer in Embodiment 2.

FIG. 8 shows a magnetic circuit model of multiple transformer 300b.

Referring to FIG. 8, in multiple transformer 300b shown in FIG. 7, magnetic paths M12 and M23 indicated by the dotted lines in FIG. 5 are actually formed by the arrangement of bypass iron cores 310. Each bypass iron core 310 thus forms a path for magnetically separating primary windings 301 corresponding to different DC/DC conversion units 50 from each other and secondary windings 302 corresponding to different DC/DC conversion units 50 from each other. Since bypass iron cores 310 is provided, magnetic resistances R8 and R9 are small compared with the case of FIG. 5.

Thus, when the AC voltage amplitude is not uniform among DC/DC conversion units 50, or even when the phase of the AC voltage is not equal due to control for providing a uniform voltage amplitude, magnetic fluxes $\varphi 1$ to $\varphi 3$ shown in FIG. 8 can pass through bypass iron core 310 and return to primary winding 301 (magnetic paths M1 to M3) producing magnetomotive forces F1 to F3, and accordingly, do not interfere with another primary winding 301. In each DC/DC conversion unit 50, accordingly, primary winding 301 and secondary winding 302 are magnetically coupled without the generation of a cross-current.

Therefore, in the power converter according to Embodiment 2, a multiple transformer with bypass iron cores can be used to prevent the generation of a cross-current between DC/DC conversion units 50, thereby restraining a power loss and improving controllability and operation reliability.

The dimensions of bypass iron core 310 can be minimized through analysis below.

Figure 9:
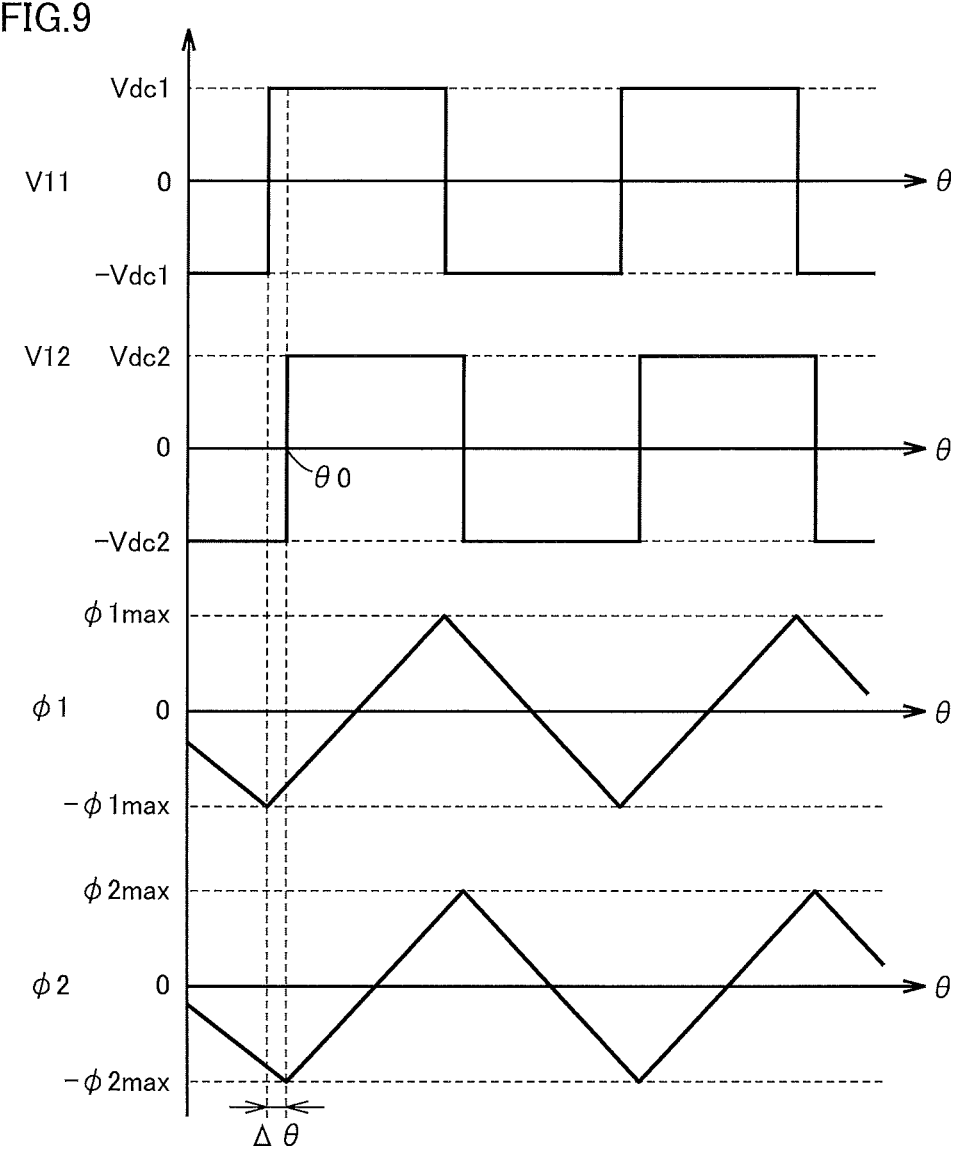
FIG. 9 is a conceptual waveform chart for illustrating a flux behavior in two primary windings adjacent to each other with a bypass iron core therebetween.

FIG. 9 is a conceptual waveform chart for illustrating a flux behavior in two primary windings adjacent to each other with a bypass iron core therebetween.

Referring to FIG. 9, it is supposed that a phase difference $\Delta\theta$ and a voltage difference $\Delta V$ ($\Delta V = Vdc1 - Vdc2$) are generated between AC voltages V11 and V12 of adjacent primary windings 301.

Magnetomotive forces F1 and F2 are generated in the magnetic circuit model shown in FIG. 8 in accordance with AC voltages V11 and V12, so that magnetic fluxes $\varphi 1$ and $\varphi 2$ in FIG. 8 are generated. Magnetic flux $\varphi 1$ is indicated by a triangular wave that is in the same phase with AC voltage V11 and has an amplitude $\varphi 1 max$, and magnetic flux $\varphi 2$ is indicated by a triangular wave that is in the same phase with AC voltage V12 and has an amplitude $\varphi 2 max$. Thus, magnetic flux $\varphi 2$ has a maximum amplitude at a timing ($\theta=0\theta$) at which AC voltage V12 changes from $-Vdc22$ to $Vdc22$. At this time, magnetic flux $\varphi 12$ in magnetic path M12 corresponding to bypass iron core 310 is represented by Equation (3) below.

$$\varphi 12 = \varphi 1\ max/(2\pi \cdot D) \times \Delta\theta - K \times \{\Delta V/(N \times f)\} \quad (3)$$

where D represents on-duty of semiconductor switching elements Q11 to Q14 and Q21 to Q24 in DC/DC conversion unit 50, and K represents a constant of proportionality common to Equation (3) and Equation (2).

In Equation (3), $\varphi 1 max$ corresponds to $\varphi max$ shown in Equation (2). In Equation (2), $\Delta\theta/(2\pi \cdot D)$ is usually smaller than one, and accordingly, $\varphi 12$ shown in Equation (3) is smaller than $\varphi max$, that is, a maximum magnetic flux in the main iron core.

Herein, a sectional area Sp of bypass iron core 310 can be determined by Equation (4) below:

$$Sp = Wp \times h \times LF \quad (4)$$

where h represents the height of the stack of ribbon-shaped magnetic materials in the main iron core, Wp represents the width of bypass iron core 310, and LF represents the space factor of the iron core material.

Maximum magnetic flux density Bpmax generated in bypass iron core 310 is represented by $Bpmax = \varphi 12/Sp$. Maximum magnetic flux density Bmax in the main iron core is represented by $Bmax = \varphi max/Sm$ using sectional area Sm of the main iron core. Since $\varphi 12 < \varphi max$ as described above, sectional area Sp required for making maximum magnetic flux density Bpmax generated in bypass iron core 310 equal to maximum magnetic flux density Bmax in the main iron core is smaller than sectional area Sm of the main iron core.

Herein, to satisfy Bpmax≤Bmax with height h of the stack of bypass iron core 310 aligned with that of the main iron core, width Wp of bypass iron core 310 can be determined by Equation (5) below:

$$Wp \geq \varphi12 \times 1/(h \times LF) \times 1/Bmax \quad (5)$$

where φ12 is common to Equation (5) and Equation (3).

Substitution of Bmax=φmax/Sm into Equation (5) results in Equation (6) below.

$$Wp \geq (\varphi12/\varphi max) \times Sm/(h \times LF) \quad (6)$$

Since Sm/(h×LF) corresponds to the width of the main iron core corresponding to maximum magnetic flux density Bmax in the main iron core, width Wp of bypass iron core 310 can be made smaller than the width of the main iron core, according to (φ12/φmax)<1.0. This can lead to miniaturization of multiple transformer 300b including bypass iron core 310.

In Embodiment 2, multiple transformer 300b having the arrangement of bypass iron cores 310 can be used to prevent the generation of a cross-section due to magnetic interference between windings, as described above. Meanwhile, it is feared that multiple transformer 300b may have a size larger than that of multiple transformer 300a. Thus, the configuration of Embodiment 1 including multiple transformer 300a can be used by carefully selecting the components of each DC/DC conversion unit 50 to restrain the generation of a cross-section associated with variations in individual difference. Such selection, however, may increase a manufacturing cost and a time for manufacturing steps. Thus, selection of any one of the power converters according to Embodiments 1 and 2 can be appropriately determined in accordance with a required cost or required reliability.

Embodiment 3

Embodiment 3 will describe a configuration for continuing an operation, in the event of failure of some of DC/DC conversion units 50, using the other normal DC/DC conversion units 50 in the power converter according to Embodiment 1.

Figure 10:
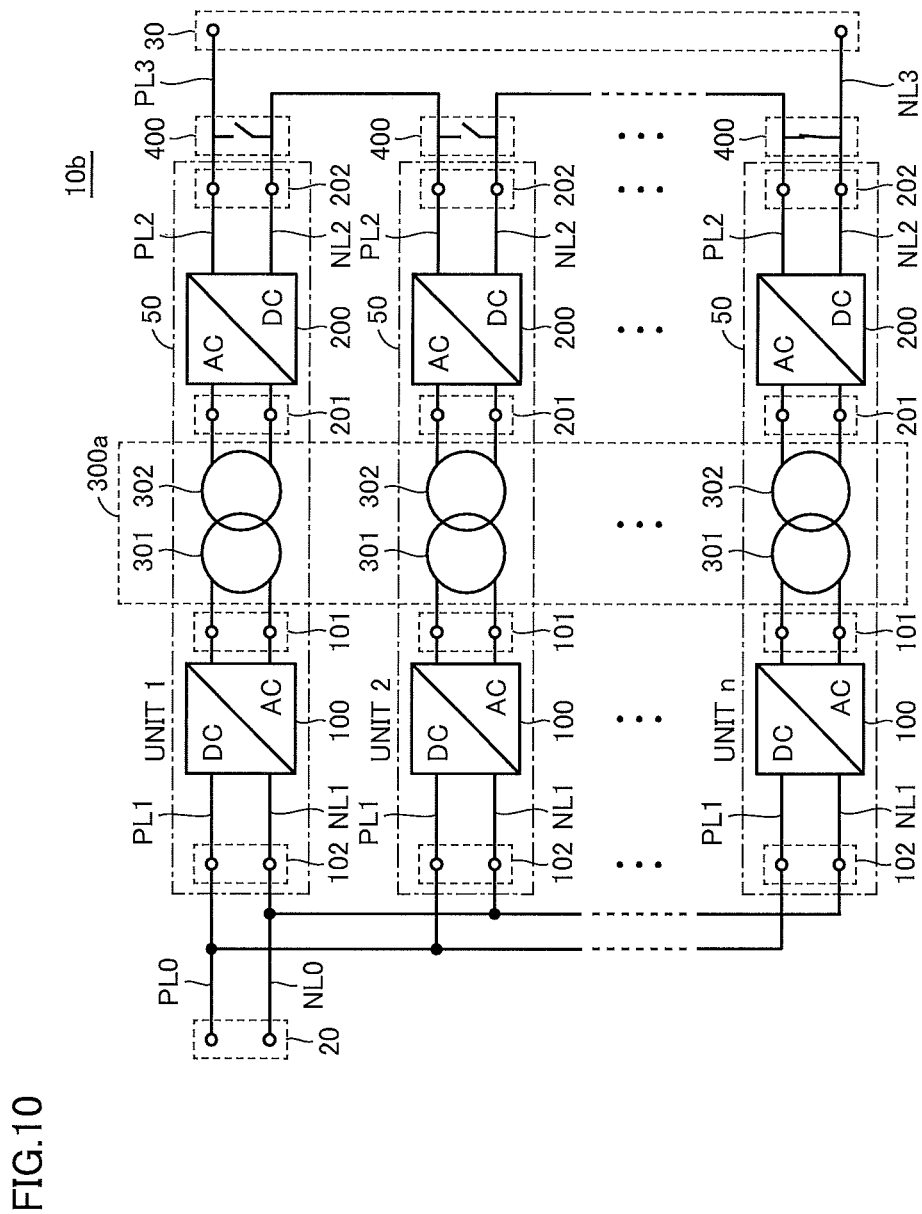
FIG. 10 is a circuit diagram showing a configuration of a power converter according to a comparative example of Embodiment 3.

FIG. 10 is a circuit diagram showing a configuration of a power converter according to a comparative example of Embodiment 3.

Referring to FIG. 10, a power converter 10b according to the comparative example differs from power converter 10a (FIG. 1) according to Embodiment 1 in that short-circuit devices 400 are further arranged corresponding to DC/DC conversion units 50. Since the other components of power converter 10b are similar to those of power converter 10a, detailed description thereof will not be repeated.

Short-circuit devices 400 are arranged corresponding to DC terminals of series-connected converters, that is, DC terminals 202 of AC/DC converters 200 in FIG. 10.

Each short-circuit device 400 is normally open, whereas it is controlled to be short-circuited in response to a control signal from the control circuit (not shown) of power converter 10b. Consequently, a short-circuit can be established by short-circuit device 400 between DC terminals 202 in DC/DC conversion unit 50 in which a failure has occurred.

An example in which only an n-th DC/DC conversion unit 50 in which a failure has occurred will be described with reference to FIG. 10. In this case, in order to continue the operation of power converter 10b, its corresponding short-circuit device 400 is controlled to be short-circuited. Further, since the supply of gate signals 61 and 62 to n-th DC/DC conversion unit 50 is stopped, semiconductor switching elements Q11 to Q14 and Q21 to Q24 are fixed in the OFF state.

In contrast, in the other (n−1) DC/DC conversion units 50, short-circuit devices 400 are maintained open, and AC/DC power conversion and DC/AC power conversion are performed through switching control of semiconductor switching elements Q11 to Q14 and Q21 to Q24 according to gate signals 61 and 62.

Thus, n-th DC/DC conversion unit 50 in which a failure has occurred can be disconnected, and DC terminals 202 of the other (n−1) DC/DC conversion units 50 can be connected in series between DC terminals 30. It is not necessary to arrange short-circuit devices 400 to DC/AC converters 100 connected in parallel between DC terminals 20.

In n-th DC/DC conversion unit 50, AC voltage is not applied from DC/AC converter 100 and AC/DC converter 200 to AC terminals 101 and 201 due to stop of gate signals 61 and 62. Consequently, the applied AC voltage does not have an equal maximum value and an equal phase among primary windings 301 and secondary windings 302 of multiple transformer 300a, thus causing a cross-current due to magnetic interference between the windings.

At this time, even when semiconductor switching elements Q11 to Q14 and Q21 to Q24 are fixed in the OFF state, a diode rectifier (full-wave rectifier) is formed of antiparallel diodes of the semiconductor switching elements in DC/AC converter 100 and AC/DC converter 200. The output of DC/DC conversion unit 50 operating as the diode rectifier is smaller than that of any other DC/DC conversion unit 50 operating normally through power conversion because short-circuit device 400 is being interrupted.

As the operation of power converter 10b is to be continued in this state, a cross-current may cause a high current to flow from DC/DC conversion unit 50 operating normally into short-circuit device 400 being interrupted. As a result, the operation of power converter 10b may not be continued due to the occurrence of a failure or stop of protection which is caused by overcurrent, occurring in DC/DC conversion unit 50 operating normally.

Figure 11:
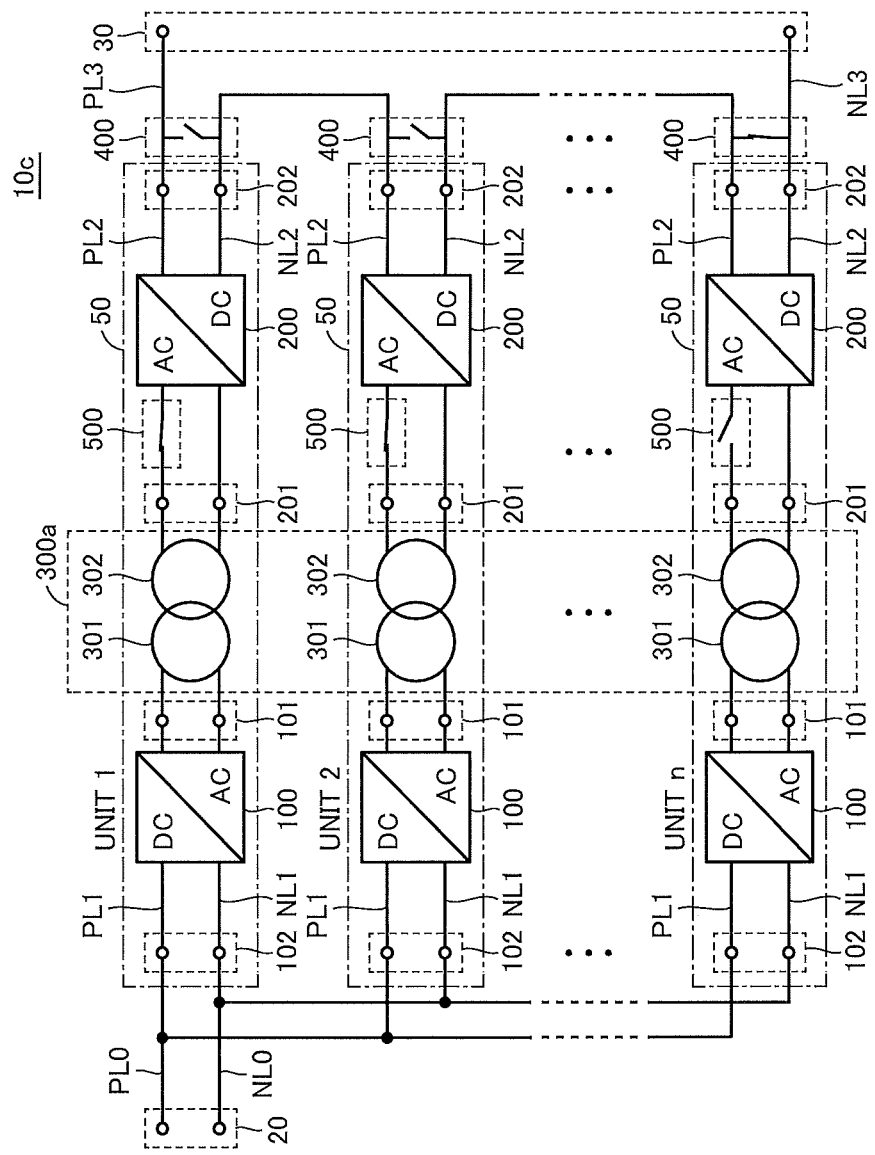
FIG. 11 is a circuit diagram showing a configuration of the power converter according to Embodiment 3.

FIG. 11 is a circuit diagram showing a configuration of a power converter according to Embodiment 3.

Referring to FIG. 11, a power converter 10c according to Embodiment 3 differs from power converter 10a according to Embodiment 1 in that it further includes short-circuit devices 400 similar to those of power converters 10b (FIG. 10) according to the comparative example and AC interruption devices 500. Since the other components of power converter 10c other than AC interruption devices 500 are similar to those of power converter 10b (FIG. 10) according to the comparative example, detailed description thereof will not be repeated.

AC interruption device 500 is arranged between secondary winding 302 and AC/DC converter 200 (AC node) in each DC/DC conversion unit 50. AC interruption device 500 is normally conductive, whereas it is controlled to be open in response to a control signal from the control circuit (not shown) of power converter 10c. Consequently, a current path between secondary winding 302 and AC/DC converter 200 can be interrupted in DC/DC conversion unit 50 in which a failure has occurred.

This can interrupt the current path that causes a cross-current from DC/DC conversion unit 50 operating normally to DC/DC conversion unit 50, supply of gate signals 61 and 62 thereto has been stopped due to the occurrence of a failure.

Thus, according to Embodiment 3, even in the event of failure of some DC/DC conversion units 50 in the power converter in which multiple transformer 300a including no bypass iron core 310 is used, short-circuit device 400 and AC interruption device 500 can continue the operation of the power converter using the other normal DC/DC conversion units 50.

In the example configuration of FIG. 11, AC interruption device 500 can be further arranged between primary winding 301 and the AC node of DC/AC converter 100, in addition to between secondary winding 302 and the AC node of AC/DC converter 200. This can restrain a cross-current also on the DC/AC converter 100 side, further improving reliability.

Modification of Embodiment 3

Figure 12:
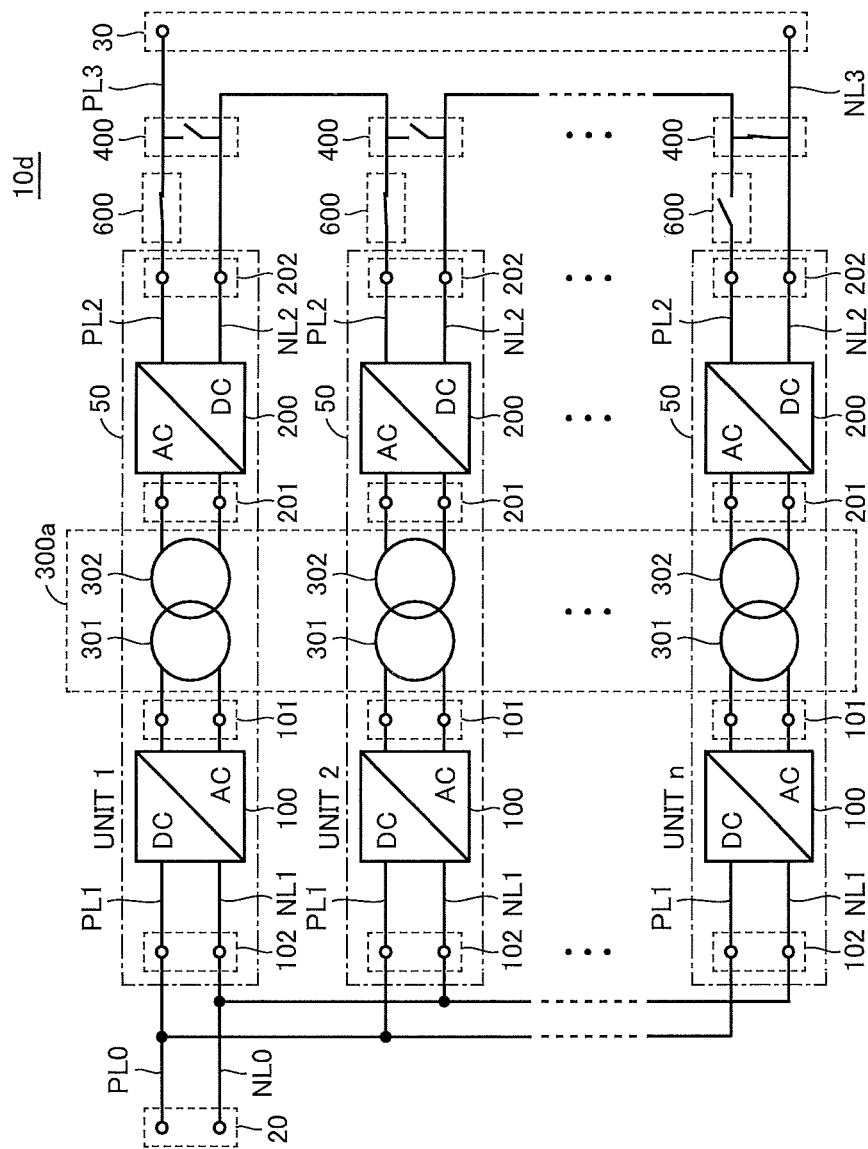
FIG. 12 is a circuit diagram showing a configuration of a power converter according to a modification of Embodiment 3.

FIG. 12 is a circuit diagram showing a configuration of a power converter 10d according to a modification of Embodiment 3.

Referring to FIG. 12, power converter 10d according to the modification of Embodiment 3 differs from power converter 10a according to Embodiment 1 in that it further includes short-circuit devices 400 similar to those of power converters 10b (FIG. 10) according to the comparative example and DC interruption devices 600. Since the components of power converter 10d other than DC interruption devices 600 are similar to those of power converter 10b (FIG. 10) according to the comparative example, detailed description thereof will not be described. In other words, power converter 10d differs from power converter 10c according to Embodiment 3 in that DC interruption devices 600 are arranged in place of AC interruption devices 500.

DC interruption device 600 is connected in series with the DC node of AC/DC converter 200 in each DC/DC conversion unit 50. DC interruption device 600 is connected to the AC/DC converter 200 side relative to short-circuit device 400.

DC interruption device 600 is normally conductive, whereas it is controlled to be open in response to a control signal from the control circuit (not shown) of power converter 10d. In DC/DC conversion unit 50 in which a failure has occurred, DC interruption device 600 is controlled to be open.

Opening DC interruption devices 600 arranged as described above can also interrupt the current path that causes a cross-current from DC/DC conversion unit 50 operating normally to DC/DC conversion unit 50 in which a failure has occurred, as in Embodiment 3.

Thus, even in the event of failure of some of DC/DC conversion units 50 in the power converter in which multiple transformer 300a including no bypass iron cores 310 is used, the modification of Embodiment 3 can also continue the operation of the power converter using the other normal DC/DC conversion units 50.

In the example configuration of FIG. 12, in addition to the DC nodes of AC/DC converters 200, DC interruption devices 600 can be arranged further to the DC nodes of DC/AC converters 100. DC interruption device 600 is preferably connected between DC terminal 102 and DC/AC converter 100. This can restrain a cross-current also on the DC/AC converter 100 side, further improving reliability.

Embodiment 4

Embodiment 4 will describe a configuration for continuing an operation as in Embodiment 3 in the event of failure of some of DC/DC conversion units 50 in the power converter according to Embodiment 2, that is, the power converter in which multiple transformer 300b including bypass iron cores 310 is used.

Figure 13:
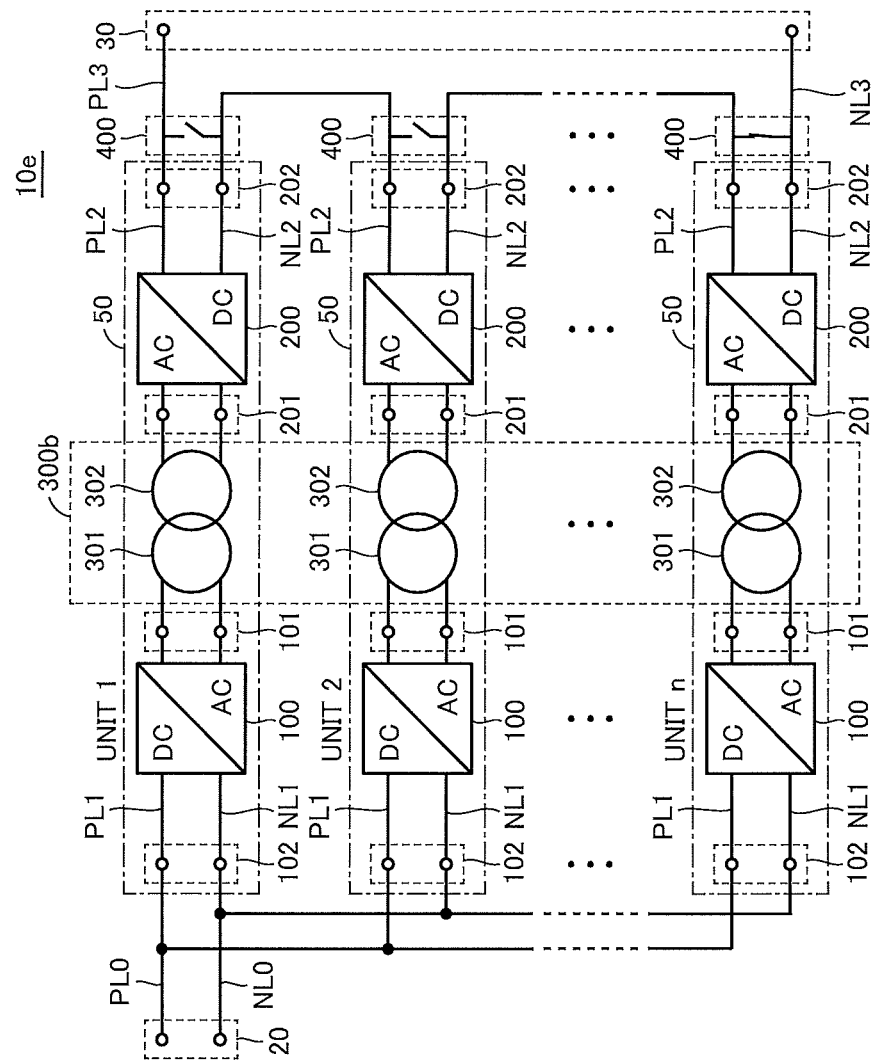
FIG. 13 is a circuit diagram showing a configuration of a power converter according to Embodiment 4.

FIG. 13 is a circuit diagram showing a configuration of a power converter according to Embodiment 4.

Referring to FIG. 13, a power converter 10e according to Embodiment 4 differs from the power converter according to Embodiment 2 in that short-circuit devices 400 are further arranged corresponding to DC/DC conversion units 50 as in Embodiment 3. In other words, the configuration of power converter 10e is similar to that of power converter 10b (FIG. 10) according to the comparative example except for the use multiple transformer 300b in place of multiple transformer 300a.

Also in power converter 10e, short-circuit devices 400 are arranged corresponding to DC terminals 202 of AC/DC converters 200 connected in series between DC terminals 30. Each short-circuit device 400 is usually open, whereas it is controlled to be short-circuited in DC/DC conversion unit 50 in which a failure has occurred.

In power converter 10e, primary winding 301 and secondary winding 302 are magnetically separated from each other between DC/DC conversion units 50 by bypass iron cores 310 arranged in multiple transformer 300b. Thus, even when AC interruption devices 500 or DC interruption devices 600 shown in FIG. 11 or 12 are not provided, a cross-current from DC/DC conversion unit 50 operating normally is not caused to DC/DC conversion unit 50 in which a failure has occurred and has been disconnected by short-circuit device 400.

As a result, even in the event of failure of some of DC/DC conversion units 50 in the power converter in which multiple transformer 300b including bypass iron cores 310 is used, the operation of the power converter can be continued using the other normal DC/DC conversion units 50.

Modifications of Embodiment 4

AC interruption devices 500 and DC interruption devices 600, which have been described respectively in Embodiment 3 and the modification thereof, can be further arranged in the circuit configuration described in Embodiment 4.

Figure 14:
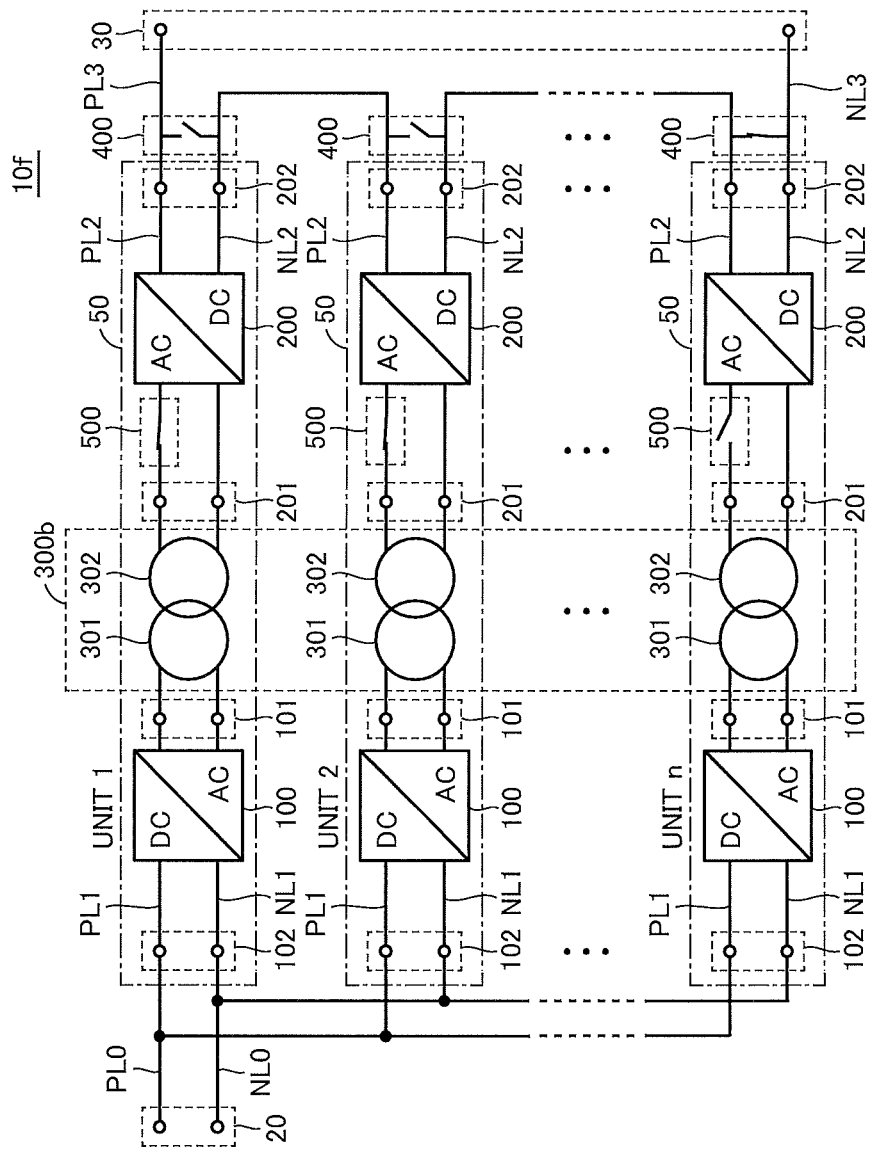
FIG. 14 is a circuit diagram illustrating a configuration of a power converter according to a first modification of Embodiment 4.

FIG. 14 is a circuit diagram illustrating a configuration of a power converter according to a first modification of Embodiment 4.

Referring to FIG. 14, a power converter 10f according to the first modification of Embodiment 4 further includes AC interruption devices 500 in addition to the components of power converter 10e (FIG. 13) according to Embodiment 4.

AC interruption device 500 is arranged between secondary winding 302 and AC/DC converter 200 (AC node) in each DC/DC conversion unit 50, as in power converter 10c (FIG. 11). In an alternative configuration, AC interruption device 500 can be further arranged between primary winding 301 and the AC node of DC/AC converter 100.

Each AC interruption device 500 is usually conductive, whereas it is controlled to be open in DC/DC conversion unit 50 in which a failure has occurred, in response to a control signal from the control circuit (not shown) of power converter 10f. In other words, in DC/DC conversion unit 50 in which a failure has occurred, short-circuit device 400 is controlled to be short-circuited, and AC interruption device 500 is controlled to be open.

Figure 15:
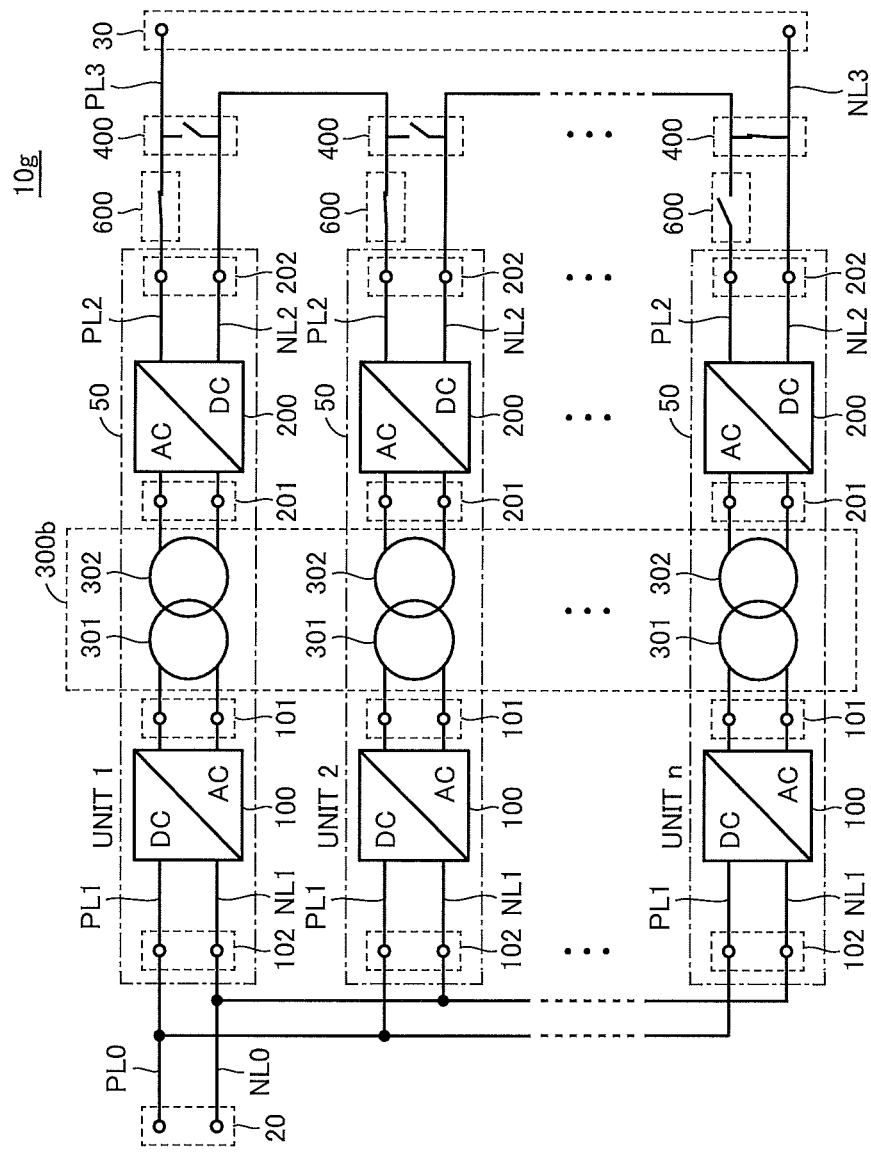
FIG. 15 is a circuit diagram illustrating a configuration of a power converter according to a second modification of Embodiment 4.

FIG. 15 is a circuit diagram illustrating a configuration of a power converter according to a second modification of Embodiment 4.

Referring to FIG. 15, a power converter 10g according to the second modification of Embodiment 4 further includes DC interruption devices 600 in addition to the components of power converter 10e (FIG. 13) according to Embodiment 4.

DC interruption device 600 is connected in series with the DC node of AC/DC converter 200, corresponding to DC/DC conversion unit 50, on the AC/DC converter 200 side relative to short-circuit device 400, as in power converter 10d (FIG. 12). Alternatively, DC interruption device 600 may be further arranged to the DC node of DC/AC converter 100. In this case, DC interruption device 600 is preferably connected between DC terminal 102 and DC/AC converter 100.

Each DC interruption device 600 is normally conductive, whereas it is controlled to be open in DC/DC conversion unit 50 in which a failure has occurred, in response to a control signal from the control circuit (not shown) of power converter 10g. In other words, in DC/DC conversion unit 50 in which a failure has occurred, short-circuit device 400 is controlled to be short-circuited, and DC interruption device 600 is controlled to be open.

By further arranging AC interruption devices 500 or DC interruption devices 600 as in the first or second modification of Embodiment 4, the generation of a cross-current can be prevented more reliably to further improve reliability when the operation is continued by interruption of short-circuit device 400 corresponding to DC/DC conversion unit 50 in which a failure has occurred in the power converter in which multiple transformer 300b including bypass iron core 310 is used.

In Embodiments 3 and 4 and the modifications thereof, short-circuit device 400 is arranged corresponding to DC/AC converter 100 and/or AC/DC converter 200 connected in series between DC terminals 20 and 30 in the power converter including multiple transformer 300a or 300b. Thus, in contrast to the example configurations of FIGS. 11 to 15, in the circuit configuration in which AC/DC converters 200 are connected in parallel between DC terminals 30 whereas DC/AC converters 100 are connected in series between DC terminals 20, short-circuit device 400 is arranged corresponding to DC terminals 102 of each of DC/AC converters 100. Also, in the circuit configuration in which DC/AC converters 100 are connected in series and AC/DC converters 200 are connected in series both of between DC terminals 20 and between DC terminals 30, respectively, short-circuit device 400 is arranged corresponding to both of DC terminals 102 of each DC/AC converter 100 and DC terminals 202 of each AC/DC converter 200.

AC interruption device 500 or DC interruption device 600 is at least arranged corresponding to DC/AC converter 100 and/or AC/DC converter 200 in which short-circuit device 400 is arranged.

Embodiment 5

Embodiment 5 will describe an example configuration of a winding conductor used in primary winding 301 and secondary winding 302 of multiple transformers 300a and 300b in Embodiments 1 to 4.

Used as the winding of a high-capacity multiple transformer is usually a winding including a plurality of narrow and small conductor element wires including an element wire insulation. The use of such a winding causes a leakage magnetic flux of the transformer to be interlinked with the winding, thus reducing an eddy-current loss of the winding to be generated. However, setting the switching frequencies of semiconductor switching elements Q11 to Q14 and Q21 to Q24 to higher frequencies (e.g., not less than 61 Hz which is higher than the frequency of a commercial AC power supply) may cause the currents input to primary winding 301 and secondary winding 302 to have a frequency higher than 61 Hz as described above, and in the above winding, current passes through only near the surface of the conductor element wire due to the generation of the skin effect. This increases equivalent resistance values of the conductor element wires, which may increase losses in multiple transformers 300a and 300b.

Figure 16:
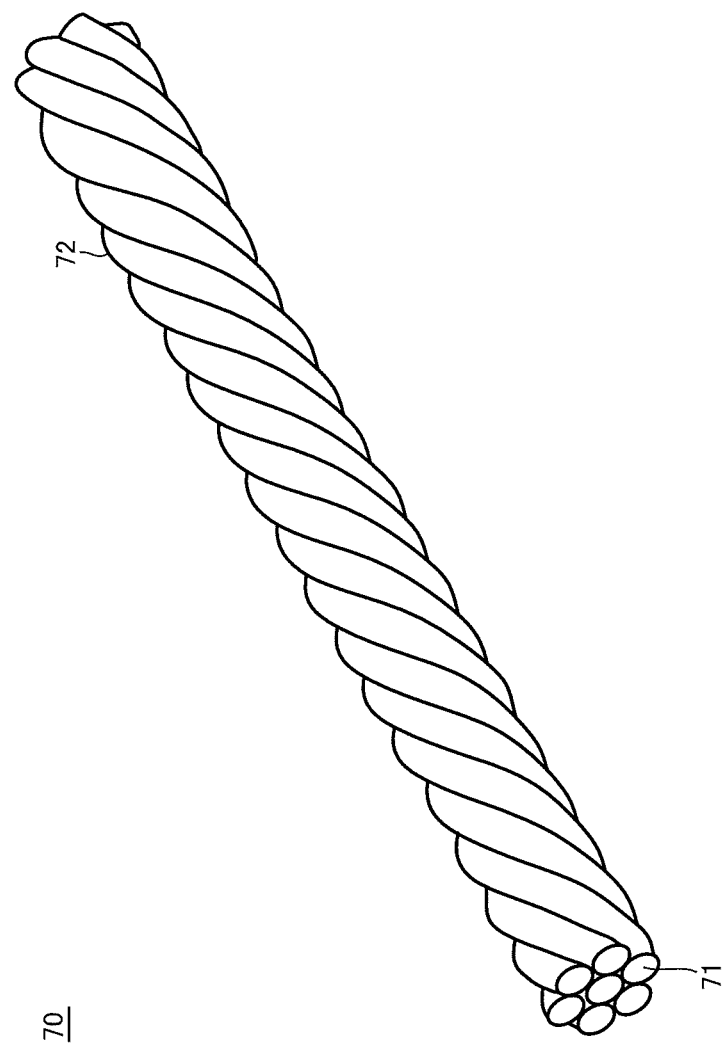
FIG. 16 is a schematic perspective view of an example winding conductive wire of a multiple transformer according to Embodiment 5.

FIG. 16 is a conceptual sectional view for illustrating an example winding conductive wire 70 according to Embodiment 5.

Referring to FIG. 16, winding conductive wire 70 is formed of a litz wire including intertwined conductor element wires 71 each having an element wire insulation 72. The use of the litz wire can restrain the skin effect and the proximity effect at high frequencies, thus restraining an increase in the loss due to higher frequencies.

Embodiment 5 can use winding conductive wire 70 formed of a litz wire in primary windings 301 and secondary windings 302 of multiple transformers 300a and 300b, thus achieving higher frequencies while restraining an increase in the loss of multiple transformers 300a and 300b. As a result, multiple transformers 300a and 300b can be miniaturized.

For the purpose of clarification, it has been initially intended at the time of filing of the present application to appropriately combine the configurations described in a plurality of embodiments described above, including any combination not mentioned in the specification, within a range free of inconsistency or contradiction.

The embodiments disclosed herein are also intended to be implemented in combination as appropriate. It should be understood that the embodiments disclosed herein are illustrative and non-restrictive in every respect. The scope of the present invention is defined by the terms of the claims, rather than the description of the embodiments above, and is intended to include any modifications within the scope and meaning equivalent to the terms of the claims.

REFERENCE SIGNS LIST 10a, 10b, 10c, 10d, 10e, 10f, 10g power converter, 20, 30 DC terminal (of power converter), 50 DC/DC conversion unit, 60 drive circuit, 61, 62 gate signal, 70 winding conductive wire, 71 conductor element wire, 72 element wire insulation, 100 DC/AC converter, 101, 102 DC terminal (of DC/DC conversion unit), 200 AC/DC converter, 201, 202 AC terminal (of DC/DC conversion unit), 300a, 300b multiple transformer, 301 primary winding, 302 secondary winding, 303x, 303y annular rectangular iron core, 304, 305 iron core leg, 306 yoke, 310 bypass iron core, 400 short-circuit device, 500 AC interruption device, 600 DC interruption device, CS snubber capacitor, Cdc1, Cdc2 DC capacitor, F1-F3 magnetomotive force, M1-M3, M5-M7, M11, M12, M23, M33 magnetic path, NL0-NL3 negative power supply line, Nac11, Nac12, Nac21, Nac22 AC node, Ndc11, Ndc12, Ndc21, Ndc22 DC node, PL0-PL3 positive power supply line, Q11-Q14, Q21-Q24 semiconductor switching element, R1-R10 magnetic resistance, TD dead time.

The invention claimed is:

1. A power converter that performs DC voltage conversion between a pair of first DC terminals and a pair of second DC terminals, the power converter comprising:

a plurality of DC/AC converters each having DC nodes, the DC nodes of the plurality of DC/AC converters being connected in parallel or in series between the first DC terminals;
a plurality of AC/DC converters each having DC nodes, the DC nodes of the plurality of AC/DC converters being connected in parallel or in series between the second DC terminals; and
a multiple transformer connected between the DC/AC converters and the AC/DC converters,
the multiple transformer including
a plurality of primary windings each connected to a corresponding one of AC nodes of the respective DC/AC converters,
a plurality of secondary windings each connected to a corresponding one of AC nodes of the respective AC/DC converters, and
a core portion around which the primary windings and the secondary windings are wound, the core portion being configured such that a magnetic path is shared among the primary windings and a magnetic path is shared among the secondary windings, wherein
each winding of one of a group of the primary windings and a group of the secondary windings is divided and wound around the core portion, and
each winding of the other of the group of the primary windings and the group of the secondary windings is wound around a portion of the core portion, the portion being sandwiched between portions of the core portion, a corresponding winding of the one group being wound around the portions.

2. The power converter according to claim 1, wherein the core portion includes a first annular rectangular iron core and a second annular rectangular iron core, and
the primary windings and the secondary windings are wound around both of the first and second annular rectangular iron cores.

3. The power converter according to claim 2, wherein the core portion further includes a bypass iron core, and
the bypass iron core is arranged to provide a path magnetically separating one of the primary windings from another primary winding and separating one of the secondary windings and another secondary winding in each of the first and second annular rectangular iron cores.

4. The power converter according to claim 2, wherein each of the first and second annular rectangular iron cores includes
a first iron core leg around which the primary windings and the secondary windings are wound,
a second iron core leg which is arranged to extend along the first iron core leg and around which the primary windings and the secondary windings are both not wound, and
a first yoke and a second yoke connecting ends of the first and second iron core legs to each other.

5. The power converter according to claim 4, wherein the core portion further includes a bypass iron core, and
the bypass iron core is arranged to connect a portion of the first iron core leg and the second iron core leg to each other, the portion being located between a first portion and a second portion, one primary winding of the primary windings and one secondary winding of the secondary windings being wound around the first portion, and another primary winding and another secondary being wound around the second portion.

6. The power converter according to claim 3, wherein the bypass iron core has a sectional area smaller than sectional areas of the first and second annular rectangular iron cores in such a range that a maximum magnetic flux density in the bypass iron core is not greater than maximum magnetic flux densities in the first and second annular rectangular iron cores.

7. The power converter according to claim 1, wherein each of the DC/AC converters and each of the AC/DC converters perform power conversion through ON-OFF control of semiconductor switching elements,
the semiconductor switching elements of the respective DC/AC converters are controlled to be turned on and off in a same phase such that AC voltages output to the AC nodes of the respective DC/AC converters have an equal frequency, an equal phase, and an equal maximum value, and
the semiconductor switching elements of the respective AC/DC converters are controlled to be turned on and off in a same phase such that AC voltages output to the AC nodes of the respective AC/DC converters have an equal frequency, an equal phase, and an equal maximum value.

8. The power converter according to claim 3, wherein each of the DC/AC converters and each of the AC/DC converters perform power conversion through ON-OFF control of semiconductor switching elements,
the semiconductor switching elements of the respective DC/AC converters are controlled to be turned on and off individually for each of the DC/AC converters such that AC voltages output to the AC nodes of the respective DC/AC converters have an equal frequency and an equal maximum value, and
the semiconductor switching elements of the respective AC/DC converters are controlled to be turned on and off individually for each of the AC/DC converters such that AC voltages output to the AC nodes of the respective AC/DC converters have an equal frequency and an equal maximum value.

9. The power converter according to claim 7, wherein each of the semiconductor switching elements is controlled to be turned on and off at a frequency not less than 61 Hz.

10. The power converter according to claim 1, wherein the primary windings and the secondary windings are wound around the core portion such that one primary winding of the primary windings and one secondary winding of the secondary windings are closer to each other than to another primary winding and another secondary winding,
one DC/AC converter of the DC/AC converters and one AC/DC converter of the AC/DC converters form a DC/DC converter unit, the one DC/AC converter being connected to the one primary winding, the one AC/DC converter being connected to the one secondary winding,
the power converter further includes
a plurality of short-circuit devices each electrically connected between the DC nodes of a corresponding one of the converters of at least one of a group of the AC/DC converters and a group of the DC/AC converters, the converters being connected in series between the first or second DC terminals, and
a plurality of AC interruption devices each electrically connected between a corresponding one of the AC nodes and a corresponding one of the primary windings or a corresponding one of the secondary windings connected to the one AC node in a corresponding one of the AC/DC converters or a corresponding one of the DC/AC converters in which a corresponding one of the short-circuit devices is arranged, each of the short-circuit devices is controlled
- to be open in the DC/DC converter unit which is in normal state, and
- to be short-circuited in the DC/DC converter unit in which a failure has occurred in at least one of the one DC/AC converter and the one AC/DC converter, and each of the AC interruption devices is controlled
- to be conductive in the DC/DC converter unit in normal state, and
- to be open in the DC/DC converter unit in which the failure has occurred.

11. The power converter according to claim 1, wherein
the primary windings and the secondary windings are wound around the core portion such that one primary winding of the primary windings and one secondary winding of the secondary windings are closer to each other than to another primary winding and another secondary winding, one DC/AC converter of the DC/AC converters and one AC/DC converter of the AC/DC converters form a DC/DC converter unit, the one DC/AC converter being connected to the one primary winding, the one AC/DC converter being connected to the one secondary winding, the power converter further includes
- a plurality of short-circuit devices each electrically connected between the DC nodes of a corresponding one of the converters of at least one of a group of the AC/DC converters and a group of the DC/AC converters, the converters being connected in series between the first or second DC terminals, and
- a plurality of DC interruption devices each connected in series with one of the DC nodes in a corresponding one of the AC/DC converters or a corresponding one of the DC/AC converters in which a corresponding one of the short-circuit devices is arranged, each of the short-circuit devices is controlled
- to be open in the DC/DC converter unit which is in normal state, and
- to be short-circuited in the DC/DC converter unit in which a failure has occurred in at least one of the one DC/AC converter and the one AC/DC converter, and each of the AC interruption devices is controlled
- to be conductive in the DC/DC converter unit in normal state, and
- to be open in the DC/DC converter unit in which the failure has occurred.

12. The power converter according to claim 3, wherein
one primary winding of the primary windings and one secondary winding of the secondary windings are wound for each of areas of the core portion which are magnetically separated from each other by the bypass iron core, one DC/AC converter of the DC/AC converters and one AC/DC converter of the AC/DC converters form a DC/DC converter unit, the one DC/AC converter being connected to the one primary winding, the one AC/DC converter being connected to the one secondary winding, the power converter further includes a plurality of short-circuit devices each electrically connected between the DC nodes of a corresponding one of the converters of at least one of a group of the AC/DC converters and a group of the DC/AC converters, the converters being connected in series between the first or second DC terminals, and each of the short-circuit devices is controlled
- to be open in the DC/DC converter unit which is in normal state, and
- to be short-circuited in the DC/DC converter unit in which a failure has occurred in at least one of the one DC/AC converter and the one AC/DC converter.

13. The power converter according to claim 12, further comprising a plurality of AC interruption devices each electrically connected between a corresponding one of the AC nodes and a corresponding one of the primary windings or a corresponding one of the secondary windings connected to the one AC node in a corresponding one of the AC/DC converters or a corresponding one of the DC/AC converters in which a corresponding one of the short-circuit devices is arranged, wherein each of the AC interruption devices is controlled
- to be conductive in the DC/DC converter unit in normal state, and
- to be open in the DC/DC converter unit in which the failure has occurred.

14. The power converter according to claim 12, further comprising a plurality of DC interruption devices each connected in series with one of the DC nodes in a corresponding one of the AC/DC converters or a corresponding one of the DC/AC converters in which a corresponding one of the short-circuit devices is arranged, and each of the DC interruption devices is controlled
- to be conductive in the DC/DC converter unit in normal state, and
- to be open in the DC/DC converter unit in which the failure has occurred.

15. The power converter according to claim 1, wherein each of the primary windings and each of the secondary windings of the multiple transformer include a litz wire including a plurality of intertwined conductor element wires, each of the conductor element wires including a wire isolation.

* * * * *